United States Patent
Moshir et al.

(10) Patent No.: US 10,992,802 B2
(45) Date of Patent: *Apr. 27, 2021

(54) SYSTEM AND METHOD FOR TRACKING AND ARCHIVING MOBILE COMMUNICATIONS

(71) Applicant: CellTrust Corporation, Scottsdale, AZ (US)

(72) Inventors: Kevin K Moshir, Scottsdale, AZ (US); Sean Moshir, Scottsdale, AZ (US); Jay M. Armstrong, Chandler, AZ (US); Brian Stanley Panicko, Phoenix, AZ (US)

(73) Assignee: CELLTRUST CORPORATION, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,344

(22) Filed: Sep. 14, 2020

(65) Prior Publication Data

US 2020/0412867 A1    Dec. 31, 2020

Related U.S. Application Data

(63) Continuation of application No. 16/536,517, filed on Aug. 9, 2019, now Pat. No. 10,778,837, which is a (Continued)

(51) Int. Cl.
H04W 4/12 (2009.01)
H04M 3/42 (2006.01)
(Continued)

(52) U.S. Cl.
CPC ....... *H04M 3/42221* (2013.01); *G06F 16/113* (2019.01); *G10L 15/22* (2013.01);
(Continued)

(58) Field of Classification Search
CPC ....... H04W 24/00; H04W 4/025; H04W 4/50; H04W 12/06; H04M 3/42
See application file for complete search history.

(56) References Cited

U.S. PATENT DOCUMENTS 8,238,891 B1 * 8/2012 Tam .................... H04M 3/4878
455/418
2008/0207236 A1    8/2008 Boerries et al.
(Continued)

*Primary Examiner* — Michael T Vu
(74) *Attorney, Agent, or Firm* — Richard E. Oney; Venjuris, P.C.

(57) ABSTRACT

A system for tracking electronic communications of a subscriber includes a gateway configured to track a communication between a mobile device and a subscriber mobile device that has a subscriber software module associated with a subscriber business number. The gateway is configured to send the communication to an Enterprise Information Archiving system. The gateway also is configured to: (i) if the communication is sent from the subscriber software module intended for the mobile device, send the communication to the mobile device via at least one of an SMS, MMS, and voice communication capability of the mobile device; and (ii) if the communication is sent from the mobile device to the subscriber business number via at least one of an SMS, MMS, and voice communication capability of the mobile device, send the communication to the subscriber software module associated with the subscriber business number.

20 Claims, 17 Drawing Sheets

Related U.S. Application Data continuation of application No. 15/579,452, filed as application No. PCT/US2016/036093 on Jun. 6, 2016, now Pat. No. 10,412,215, which is a continuation of application No. 14/890,192, filed as application No. PCT/US2014/038713 on May 20, 2014, now Pat. No. 9,775,012, said application No. 15/579,452 is a continuation of application No. PCT/US2014/038713, filed on May 20, 2014, and a continuation of application No. 13/031,495, filed on Feb. 21, 2011, now Pat. No. 9,680,803, which is a continuation of application No. 12/414,355, filed on Mar. 30, 2009, now abandoned, and a continuation-in-part of application No. 11/807,024, filed on May 25, 2007, now Pat. No. 7,920,851.

(60) Provisional application No. 62/171,890, filed on Jun. 5, 2015, provisional application No. 61/825,496, filed on May 20, 2013, provisional application No. 61/040,526, filed on Mar. 28, 2008, provisional application No. 60/920,603, filed on Mar. 29, 2007, provisional application No. 60/809,052, filed on May 25, 2006.

(51) Int. Cl.
| | |
|---|---|
| *H04L 12/58* | (2006.01) |
| *H04W 4/50* | (2018.01) |
| *G10L 15/30* | (2013.01) |
| *G10L 15/22* | (2006.01) |
| *H04L 29/06* | (2006.01) |
| *G06F 16/11* | (2019.01) |
| *H04W 4/14* | (2009.01) |
| *H04W 12/02* | (2009.01) |
| *G10L 15/26* | (2006.01) |
| *H04W 12/082* | (2021.01) |
| *H04W 8/26* | (2009.01) |
| *H04W 88/16* | (2009.01) |

(52) U.S. Cl.
CPC ............ *G10L 15/26* (2013.01); *G10L 15/30* (2013.01); *H04L 51/14* (2013.01); *H04L 63/0428* (2013.01); *H04L 63/304* (2013.01); *H04M 3/42323* (2013.01); *H04W 4/12* (2013.01); *H04W 4/14* (2013.01); *H04W 4/50* (2018.02); *H04W 12/02* (2013.01); *H04W 12/082* (2021.01); *H04L 51/066* (2013.01); *H04L 51/38* (2013.01); *H04L 2463/121* (2013.01); *H04M 2201/60* (2013.01); *H04M 2203/303* (2013.01); *H04M 2203/6009* (2013.01); *H04W 8/26* (2013.01); *H04W 88/16* (2013.01)

(56) References Cited

U.S. PATENT DOCUMENTS

| | | |
|---|---|---|
| 2010/0173605 A1 | 7/2010 | Moraes |
| 2012/0089747 A1 | 4/2012 | Attanasio |
| 2012/0221962 A1 | 8/2012 | Lew |
| 2013/0128801 A1 | 5/2013 | Zhu |

* cited by examiner

SYSTEM AND METHOD FOR TRACKING AND ARCHIVING MOBILE COMMUNICATIONS

RELATED APPLICATION

This application is a continuation of U.S. patent application Ser. No. 16/536,517, filed Aug. 9, 2019 and entitled System And Method For Tracking And Archiving Mobile Communications, which is continuation of U.S. patent application Ser. No. 15/579,452, with a filing date of Jun. 6, 2016, now U.S. patent Ser. No. 10/412,215 issued on Jul. 10, 2019, and which is a 371 of PCT/US16/36093, filed on Jun. 6, 2016, which is a continuation of U.S. patent application Ser. No. 14/890,192 with a filing date of May 20, 2014, now U.S. Pat. No. 9,775,012 issued on Sep. 26, 2017, which claims the benefit of U.S. Provisional Application No. 62/171,890 filed on Jun. 5, 2015. U.S. patent application Ser. No. 14/890,192 is a 371 of PCT/US14/38713, filed on May 20, 2014, which claims the benefit of U.S. Provisional Application No. 61/825,496, filed on May 20, 2013. U.S. patent application Ser. No. 15/579,452 is a continuation of PCT/US14/38713, filed on May 20, 2014 and a continuation of U.S. patent application Ser. No. 13/031,495, filed on Feb. 21, 2011, now U.S. Pat. No. 9,680,803 issued on Jun. 13, 2017, which is a continuation of U.S. patent application Ser. No. 12/414,355, filed on Mar. 30, 2009, now abandoned, which claims the benefit of U.S. Provisional Patent Application 61/040,526, filed on Mar. 28, 2008. U.S. patent application Ser. No. 13/031,495 is a continuation-in-part of U.S. patent application Ser. No. 11/807,024, filed on May 25, 2007, now U.S. Pat. No. 7,920,851 issued on Apr. 5, 2011, which claims the benefit of U.S. Provisional Patent No. 60/920,603 filed Mar. 29, 2007 and claims the benefit of U.S. Provisional Patent Application No. 60/809,052 filed May 25, 2006. The entire contents of all of the foregoing applications are hereby incorporated by this reference with a continuity inventors.

FIELD OF INVENTION

This invention relates to systems and methods for wireless communication, cellular telephony, Internet-based systems and methods, software, computers, or a combination thereof. More particularly, the invention relates to a system and method for tracking and archiving mobile communications.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

Systems and methods have existed for sending text messages, such as SMS messages, for many years. Over the last decade, SMS usage has increased significantly. SMS is now used for business communication. But such business use presents a number of challenges. Aside from encryption and securing communications, compliancy, reporting and auditing have become major requirements for many vertical industries, such as finance, government and healthcare businesses. Present systems and methods for mobile communications, including SMS communications, are inadequate to meet these requirements.

Practically all mobile phones are capable of sending SMS messages. The user of the phone, however, typically must sign up for a proper SMS plan with his/her carrier. When SMS is used for communication, there is no easy solution to trace the communication that is taking place. This makes SMS communication an unsuitable tool for an enterprise that requires tracking and reporting of the information for the purpose of audits and compliance.

When sending SMS from one mobile device to another, SMS is sent directly from the mobile device to the carrier for that mobile device. If the recipient's mobile device is with the same carrier, then the communication is sent to the recipient's device. Otherwise, the communication is sent to the carrier of the recipient which again transmits the communication to the recipient's mobile device. In either case, the typical path for SMS does not get stored in a manner that is managed by the enterprise. Although the communication via SMS is stored within the carrier infrastructure (including carrier partners and vendors), for an enterprise to obtain reports for the purpose of compliancy would require special arrangements with the carrier.

Furthermore, Bring Your Own Device (BYOD) is an industry trend and as a result, more and more enterprises must deal with a variety of phones and carriers. This makes having arrangements with carriers to obtain SMS reporting a difficult, if not impossible, task. Furthermore, in a BYOD environment, when employees leave the company, they typically continue receiving SMS messages on their personal mobile phone from their customers or other employees because there is no easy way to route SMS messages of one phone to another. Even in a corporate environment in which the enterprise provides the phones, many employees may request to forward their phone numbers to their own personal mobile phone since they may receive personal calls or SMS messages on such numbers. This issue is more evident when many device manufacturers and/or mobile vendors offer containerization solutions for mobile devices, which allow enterprise and personal applications and/or information to coexist on the same mobile phone.

There exist needs and potential for benefits for tracking communication between employee and employee as well as between employee and consumers/customers. As used in this specification, such tracking can include recording, archiving, making available for reporting and/or storing for an extended period of time. Compliance with many different regulations (such as SOX, FINRA and so on) requires tracking of communications. For example, FINRA requires employees of financial institutions, more specifically brokers, to track their communications with their clients or consumers. Similarly, other institutions may have to or wish to track forms of communication such as messaging or voice, all textual messages like email or SMS as well as all voice communication from mobile calls between their staff and customers.

In addition, there is a need to provide a personal number to mobile users that is separate from the carrier assigned number and that allows an enterprise to retain the ownership of such number and consequently continue receiving the company's SMS messages and/or voice calls after the employee is gone.

It is an object of the present invention, among other things, to provide a system and method that allows an institution or enterprise to track and archive communications, such as the communication that takes place between an employee of an organization and consumers/customers of that organization, and to meet the needs described above.

Potential for improvement exists in these and other areas that may be apparent to a person of skill in the art having studied this document.

SUMMARY OF PARTICULAR EMBODIMENTS OF THE INVENTION

The contents of this summary section are provided only as a simplified introduction to the disclosure, and are not intended to be used to limit the scope of the appended claims.

In accordance with the purposes of the invention as embodied and broadly described in this document, there is provided a method for tracking electronic communications for a subscriber. In some embodiments, the method includes: associating a subscriber business number with a subscriber software module configured to run on a subscriber mobile device; and at a gateway, receiving a communication sent from a mobile device to the subscriber business number associated with the subscriber software module, wherein the communication is sent to the gateway via at least one of an SMS, MMS and a voice communication capability of the mobile device. The gateway is configured to send the communication to the subscriber software module associated with the subscriber business number and to an Enterprise Information Archiving system.

Some methods of the invention include associating a subscriber business number with a subscriber software module configured to run on a subscriber mobile device; and at a gateway, receiving a communication from the subscriber software module wherein the communication is intended for a mobile device. The gateway is configured: to send the communication received from the subscriber software module to the intended mobile device via at least one of an SMS, MMS and voice communication capability of the mobile device, wherein the communication is shown on the intended mobile device as originating from the subscriber business number; and to send the communication to an Enterprise Information Archiving system.

A system for tracking electronic communications of a subscriber according to the present invention includes a gateway configured to track a communication between a mobile device and a subscriber mobile device, wherein the subscriber mobile device includes a subscriber software module that is associated with a subscriber business number. The gateway is configured to send the communication to an Enterprise Information Archiving system. The gateway also is configured to do at least one of the following: (i) if the communication is sent from the subscriber software module intended for the mobile device, send the communication to the mobile device via at least one of an SMS, MMS, and voice communication capability of the mobile device, wherein the communication is shown on the mobile device as originating from the subscriber business number; and (ii) if the communication is sent from the mobile device to the subscriber business number via at least one of an SMS, MMS, and voice communication capability of the mobile device, send the communication to the subscriber software module associated with the subscriber business number.

Some methods of the present invention include: associating a subscriber business number with a subscriber software module configured to run on a subscriber mobile device; and at a gateway, receiving a voice communication sent from a mobile device to the subscriber business number associated with the subscriber software module, and sending the voice communication to both a PBX and the subscriber software module associated with the subscriber business number. The gateway is configured to send the voice communication to an Enterprise Information Archiving system. In some embodiments, the gateway is configured to stop sending the voice communication to the subscriber software module once the subscriber has been reached via the PBX. In some embodiments, the gateway is configured to stop sending the voice communication to the PBX once the subscriber has been reached via the subscriber software module.

According to some methods and embodiments of the present invention, the Enterprise Information Archiving system is configured for electronic discovery.

According to some methods and embodiments, the subscriber mobile device includes a mobile container for managing applications inside the container and the subscriber software module includes an application inside the container.

According to some methods and embodiments, the subscriber mobile device is associated with a phone number assigned by a mobile carrier to a Subscriber Identification Module (SIM) and the subscriber business number is different from the assigned SIM phone number.

According to methods and embodiments, the subscriber mobile device includes at least one of a mobile phone, a smart phone, a laptop computer, a tablet and a desktop computer.

According to some methods and embodiments, the subscriber mobile phone is configured to operate with a carrier network that is one of a CDMA network and a GSM network.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention. The drawings illustrate, among other things, various particular examples of embodiments and methods, and certain examples of characteristics thereof. Different embodiments include various combinations of elements or acts shown in the drawings, described herein, known in the art, or a combination thereof.

mobile device and a non-subscriber's (e.g., customer's) mobile device in accordance with the present invention.

Figure 5:
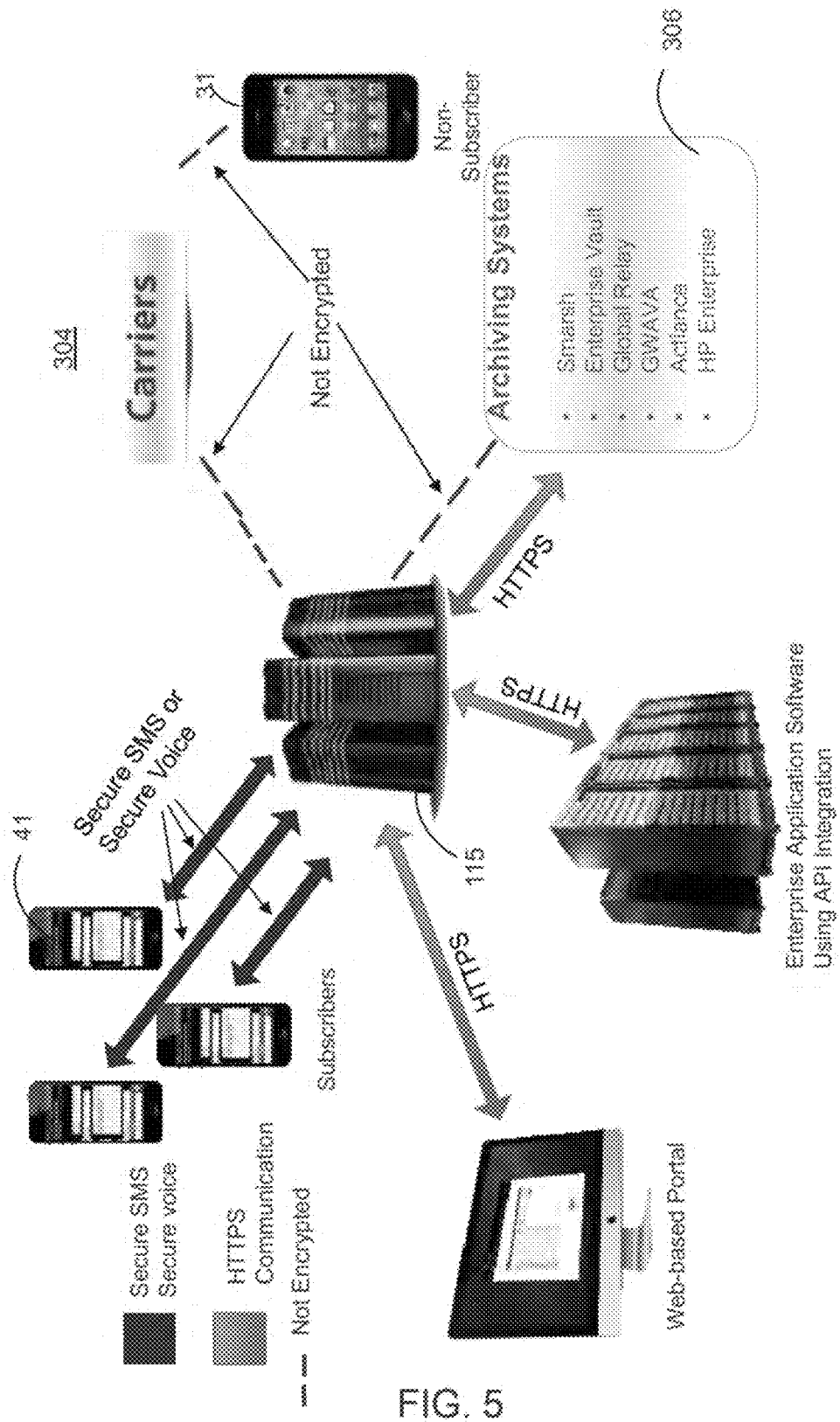

FIG. 5 is a block diagram showing communication channels linking an SMS server with a plurality of subscriber (e.g., employee) mobile devices, a customer (non-subscriber) device, customer application servers, an administrator/operator portal and an archiving system.

Figure 6:
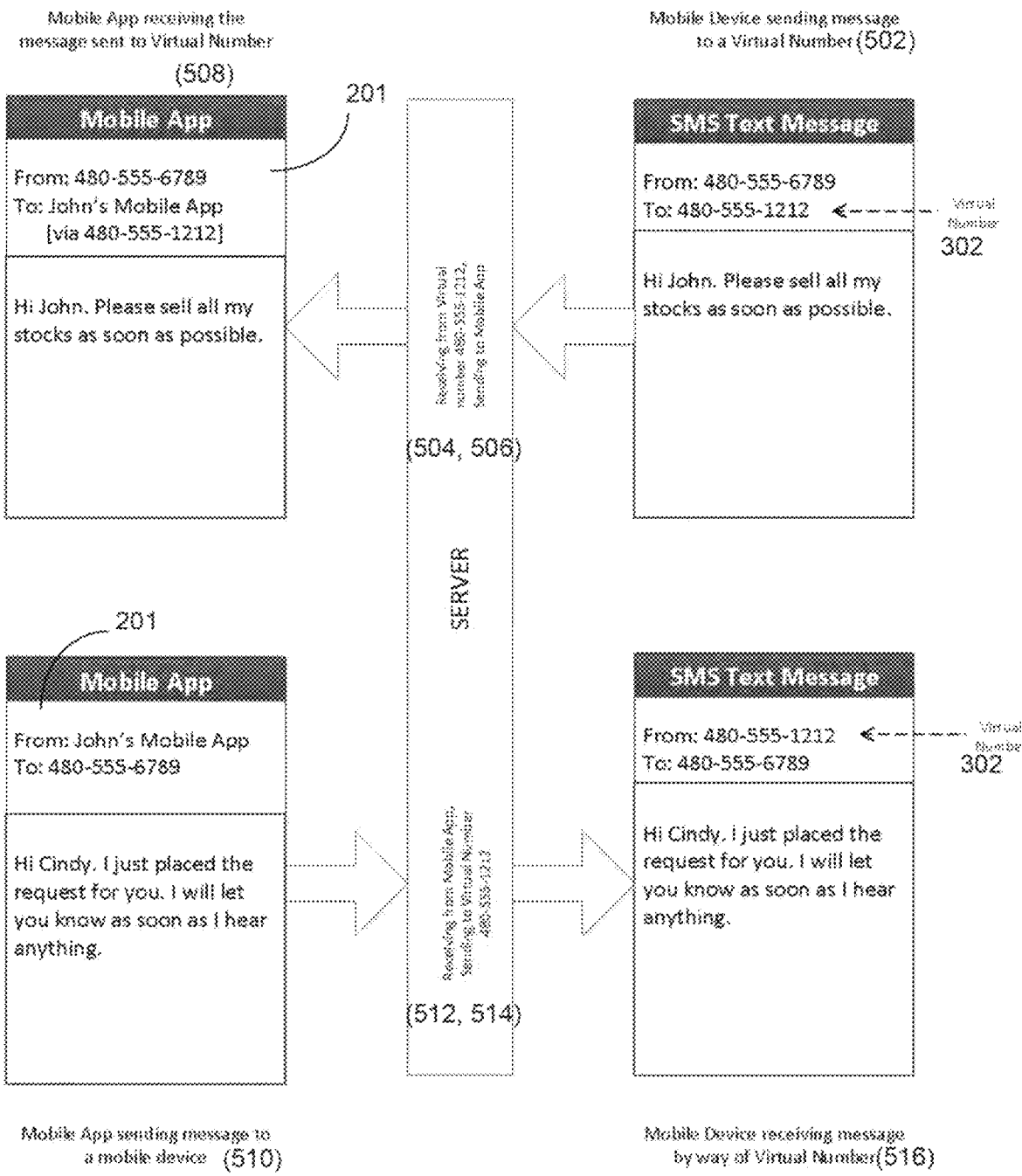

FIG. 6 is a diagram illustrating an exemplary process for communicating SMS messages between a non-subscriber's mobile device and a secure mobile application on a subscriber's mobile device using a virtual number, all in accordance with the present invention.

Figure 7:
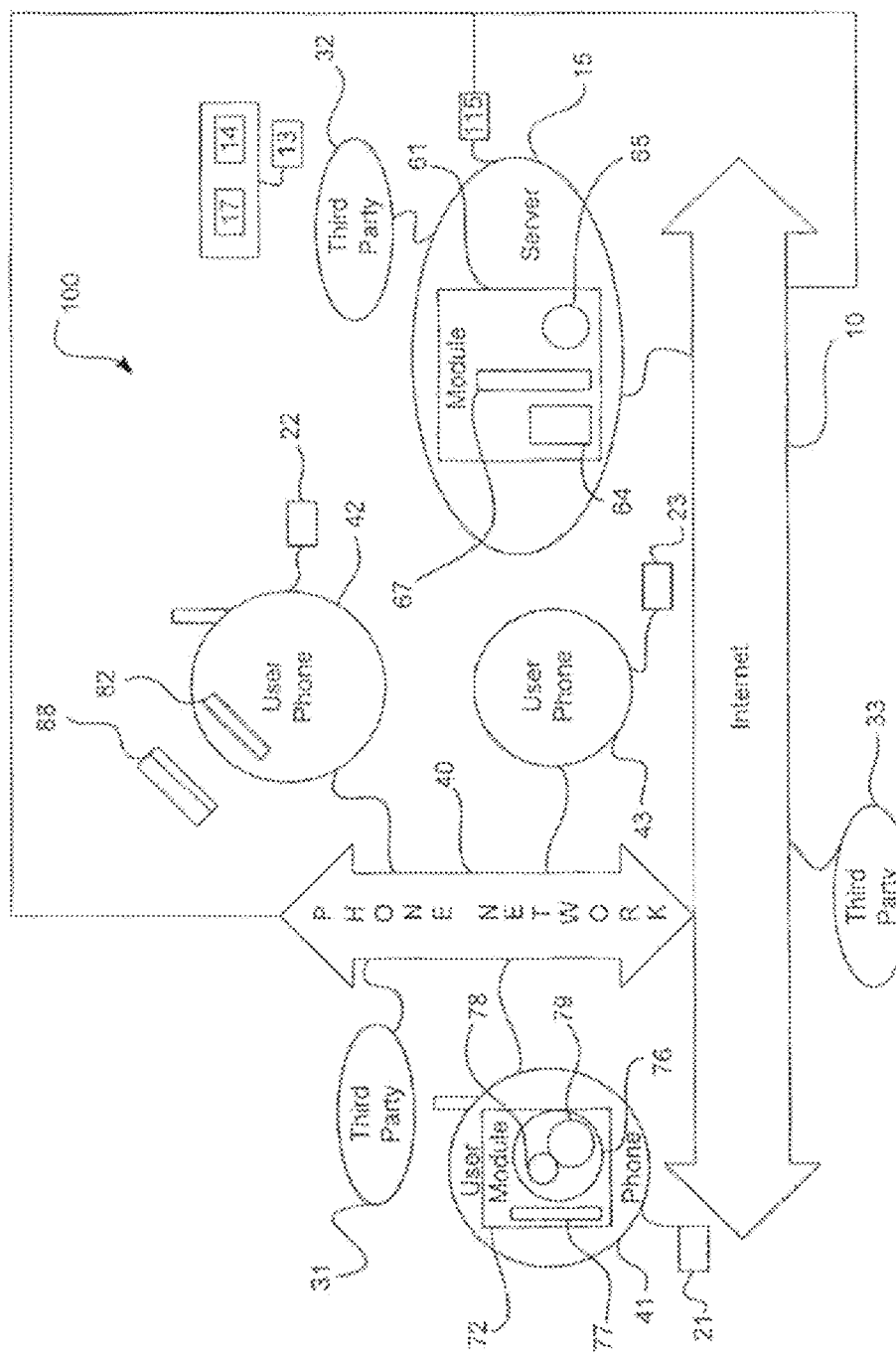

FIG. 7 is a block diagram of one example of a system that can be configured for managing SMS and mobile voice communications in an encrypted and secure manner, with which various embodiments and methods of the invention can operate.

Figure 8:
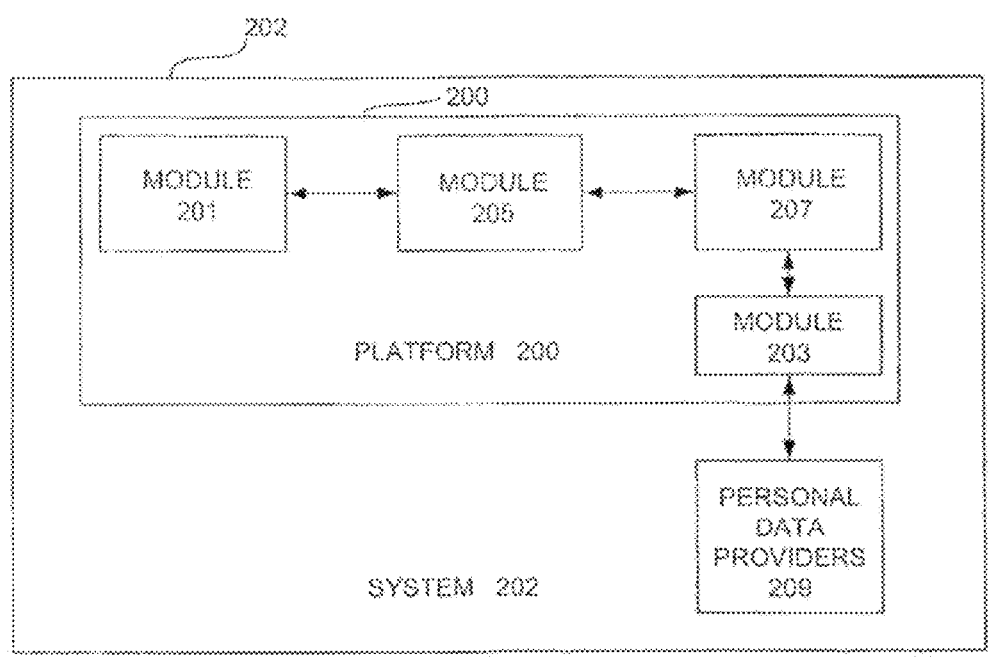

FIG. 8 is a block diagram illustrating an example of a system for managing and disseminating information and/or messages for a number of users, which system can be used in connection with the present invention.

Figure 9:
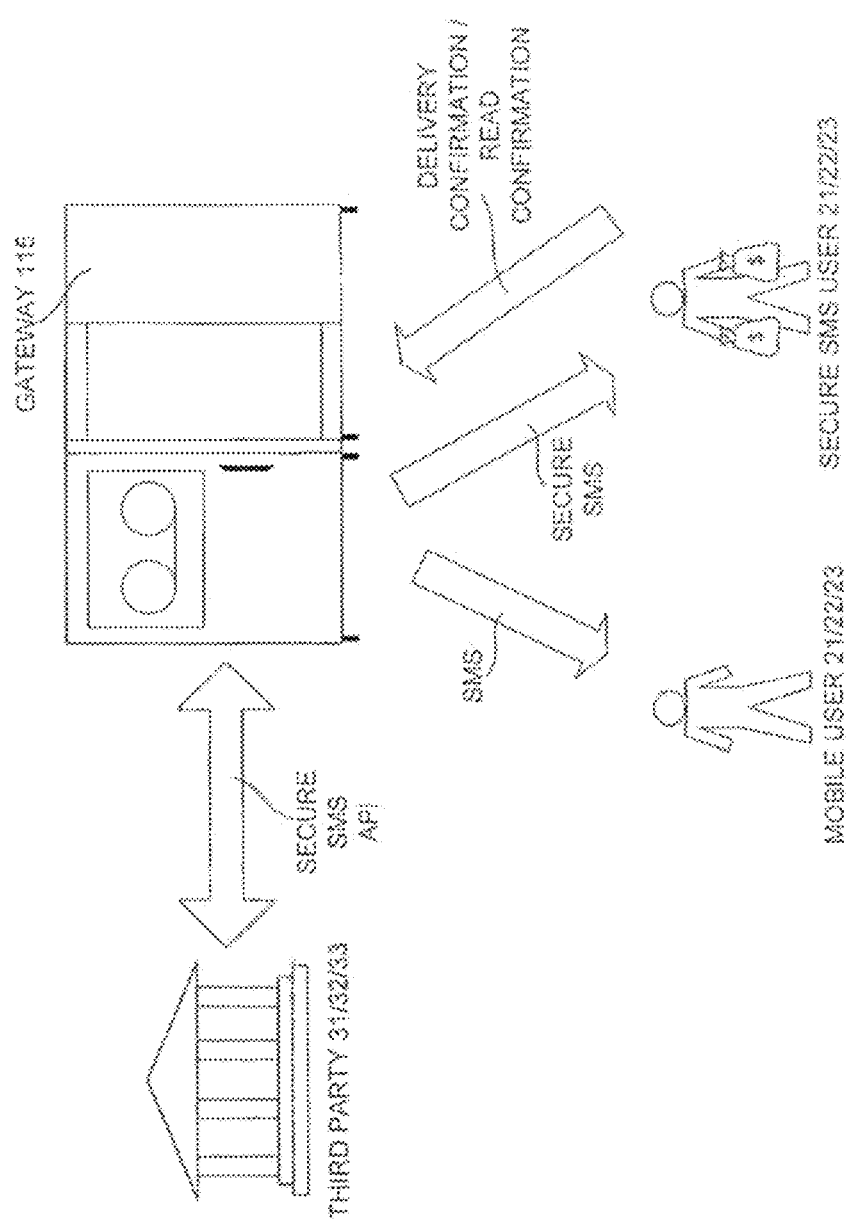

FIG. 9 illustrates communication between mobile users and/or third parties via a gateway 115 in order to create, send, receive, and/or store short messaging service (SMS) messages and multimedia messaging service (MMS) messages in a secure manner.

Figure 10:
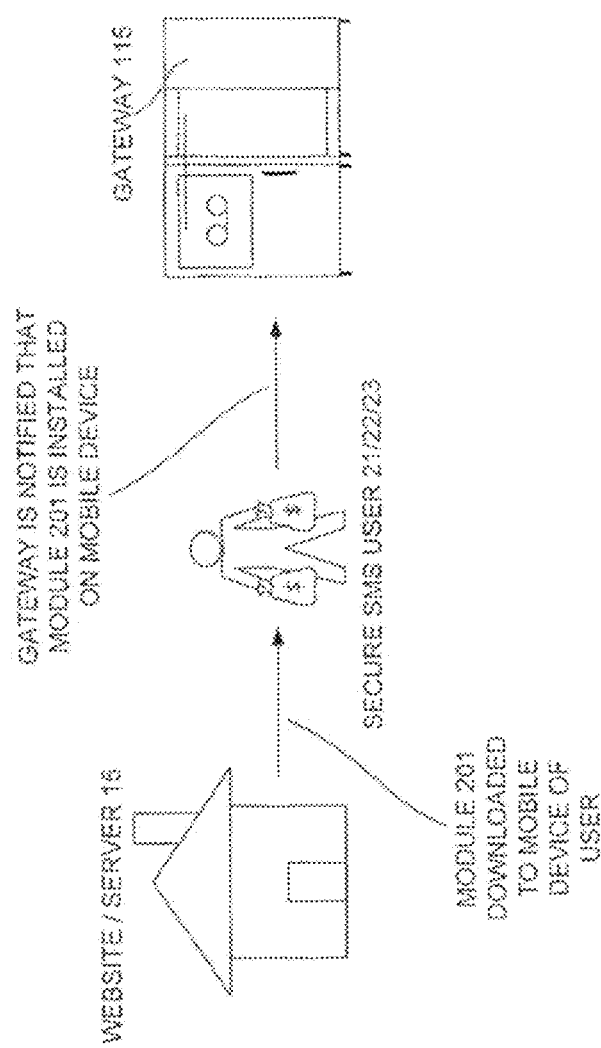

FIG. 10 illustrates installation and registration of a software module on a mobile device.

Figure 11:
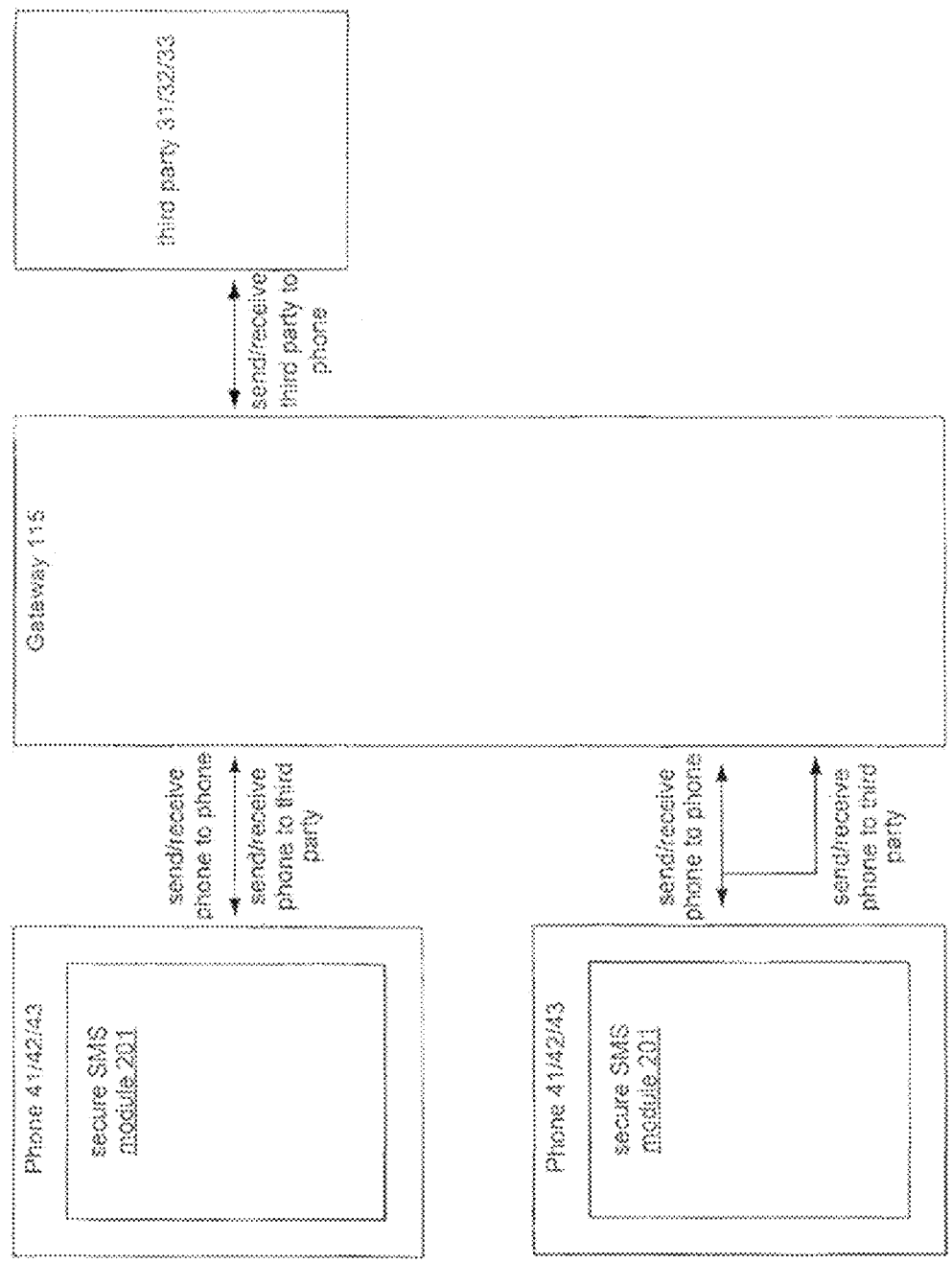

FIG. 11 further illustrates communication between mobile users and/or third parties via a gateway 115.

Figure 12:
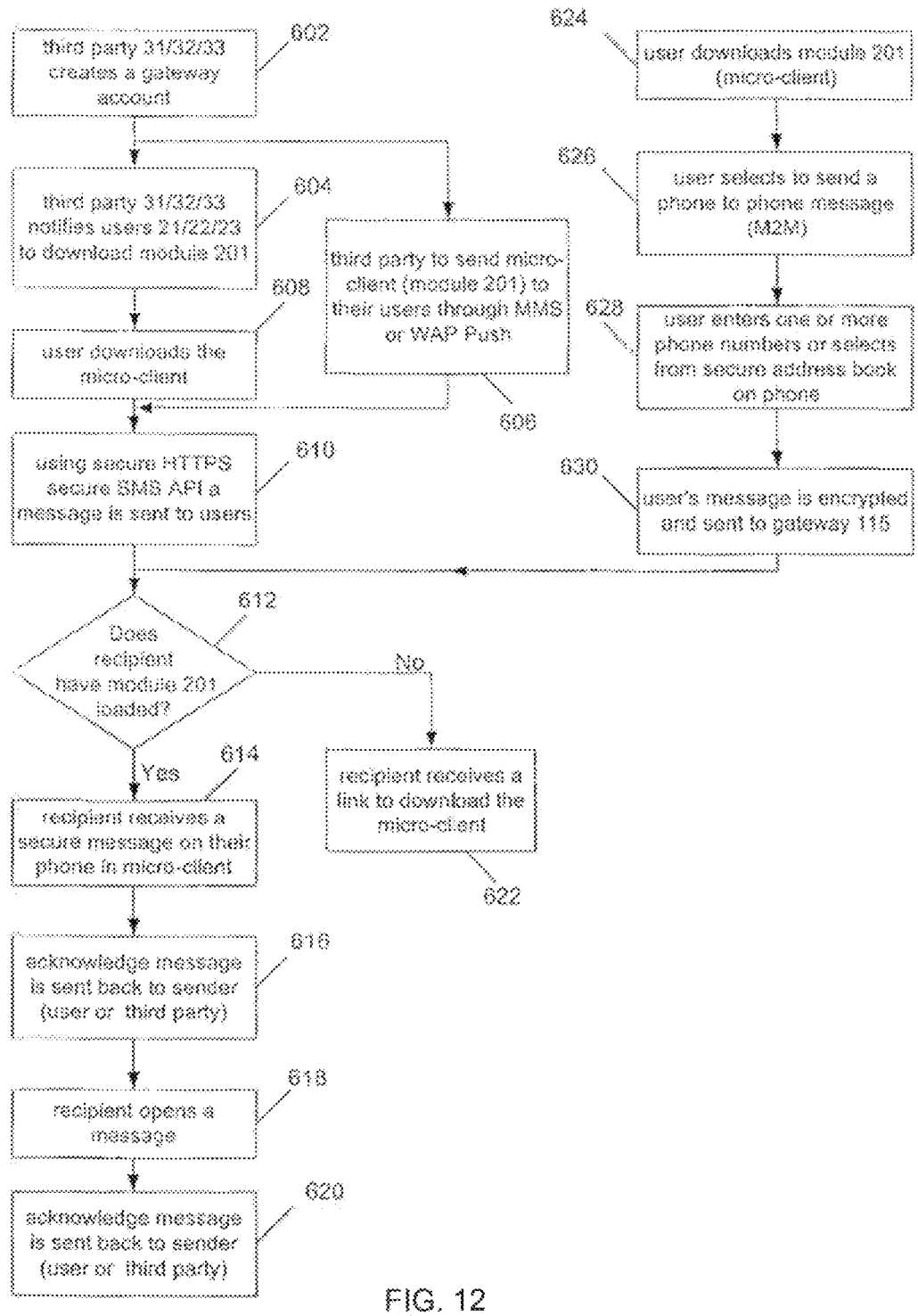

FIG. 12 is a flowchart illustrating an example of a method for securely transmitting a message, such as an SMS message or an MMS message.

Figure 13:
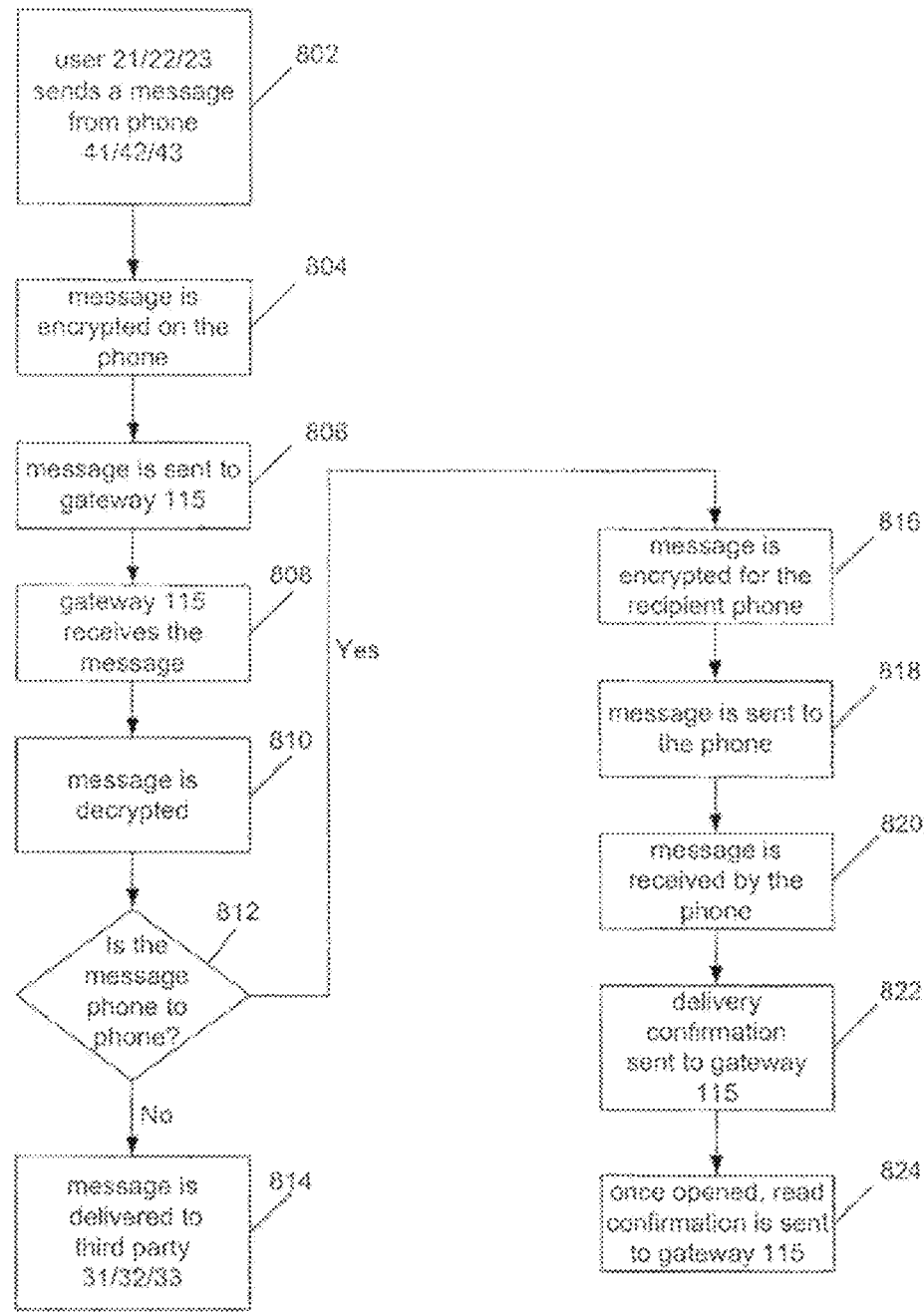

FIG. 13 is a flowchart illustrating another method for securely transmitting a message.

Figure 14:
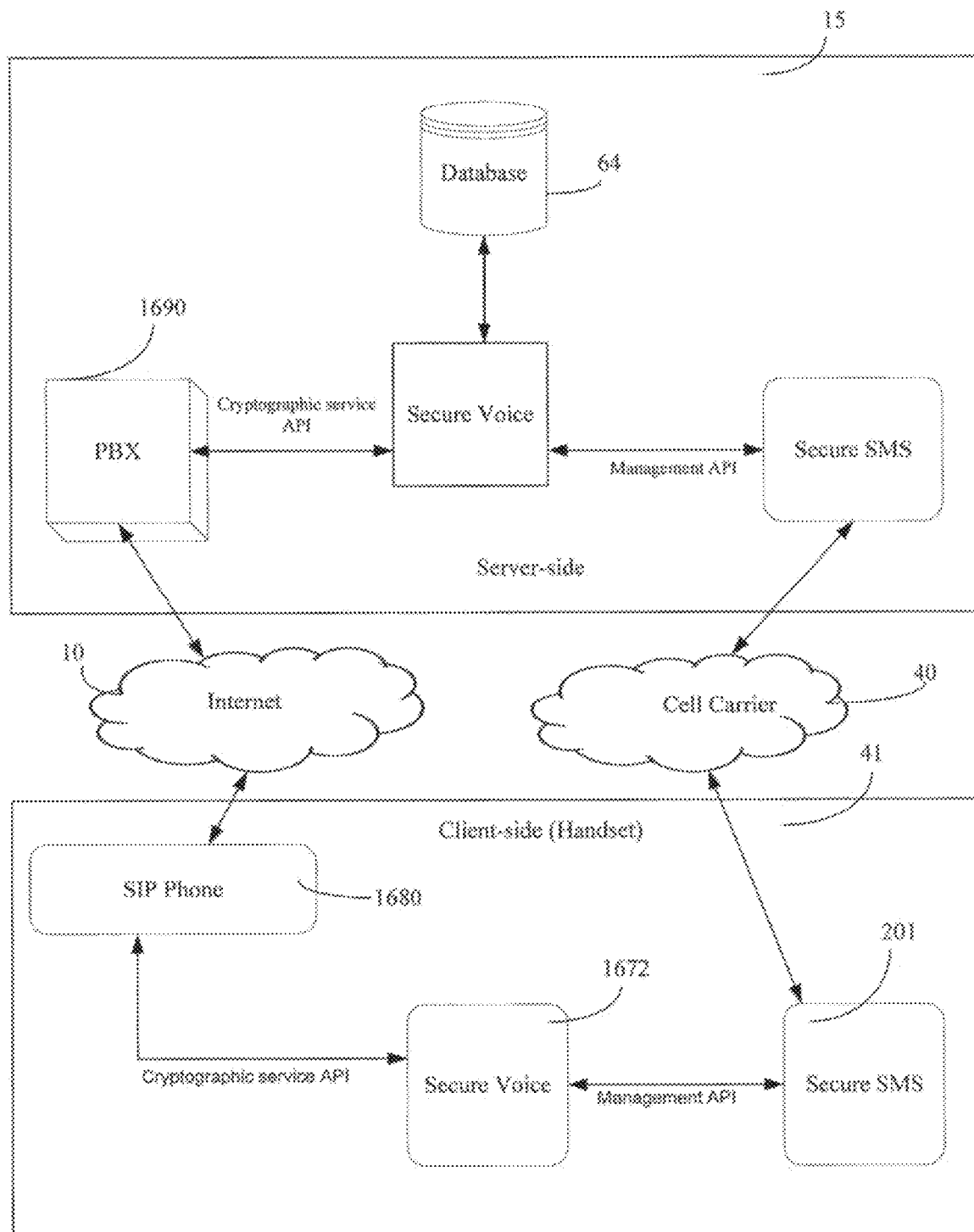

FIG. 14 is a block diagram illustrating an example of the server-side/client side information flow for an embodiment of a system for managing mobile voice communications in an encrypted and secure manner.

Figure 15:
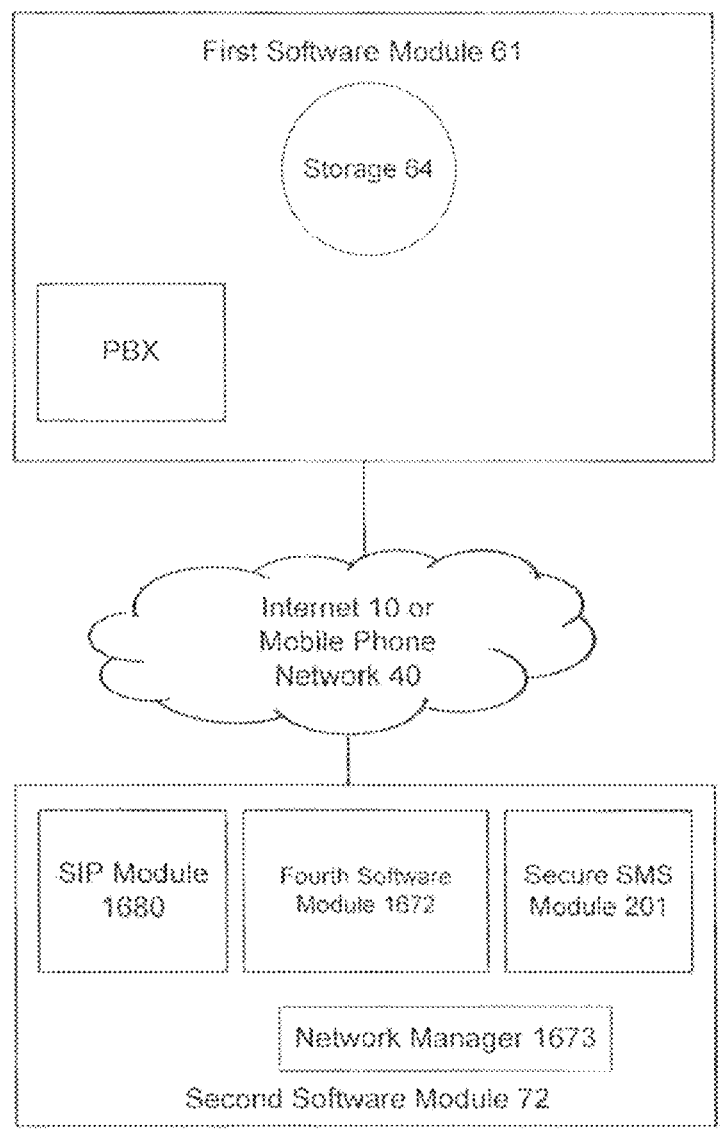

FIG. 15 is a flowchart illustrating an example method of managing mobile voice communications in an encrypted and secure manner.

Figure 16:
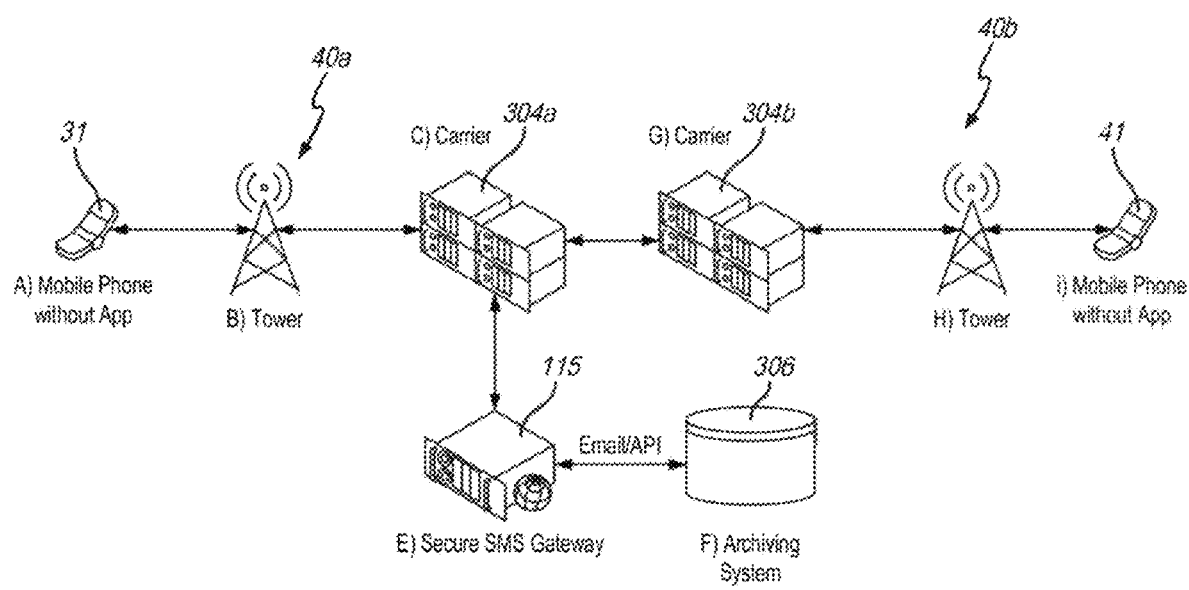

FIG. 16 is a block diagram illustrating another embodiment of a system in accordance with the present invention, which can be used for tracking communications.

DETAILED DESCRIPTION OF EXAMPLES OF EMBODIMENTS

The present disclosure provides, among other things, a number of embodiments and methods for managing short messaging service (SMS) messages and multimedia messaging service (MMS) messages in a secure manner and for tracking such messages. While various embodiments and methods are described in sufficient detail to enable those skilled in the art to practice the invention, it should be understood that other embodiments may be realized and that various changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical and/or electronic couplings between the various elements. It should be noted that many alternative or additional functional relationships or physical connections may be present in a practical system.

As used herein, a "mobile device" may be any device configured for transmitting and receiving electronic communications, for example a cellular phone, a satellite phone, a Palm Pilot™ device, personal digital assistant (PDA), BlackBerry™ device, iPhone™ device, iPad™ tablet computer, Samsung Galaxy Note™ smartphone and tablet computer, Samsung Galaxy Tab™ tablet computer, smartphone, desktop computer, laptop computer, tablet computer, netbook, portable device for communication, or the like. Throughout various exemplary embodiments illustrated or discussed in this disclosure, a mobile device may be referred to herein as a "phone" or "mobile phone", but it should be understood that it may have other functionality or be any other type of mobile device.

Use of Long Code as Virtual Phone Number

Figure 2:
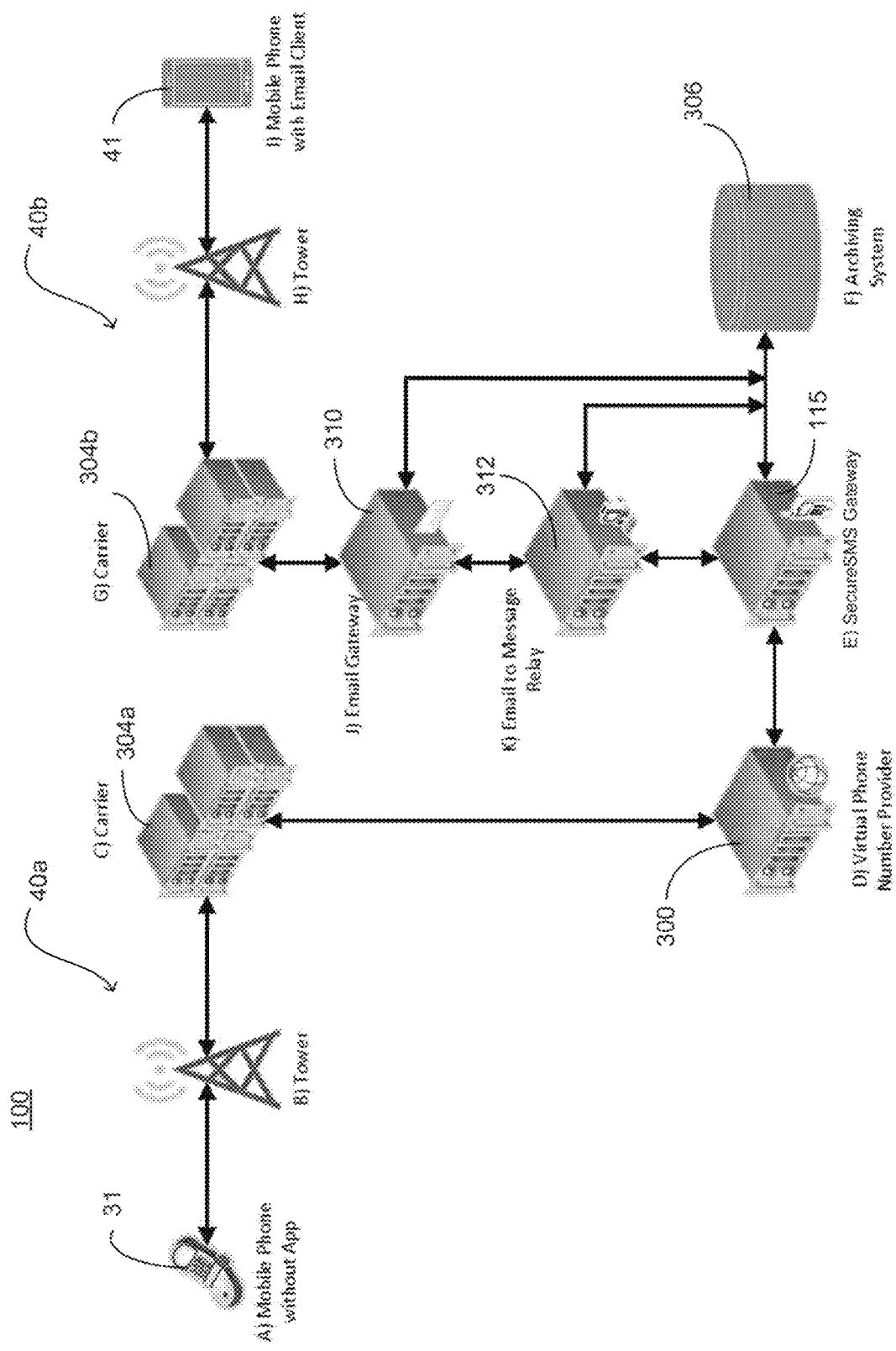
FIG. 2 is a block diagram illustrating still another embodiment of a system in accordance with the present invention, which can be used for tracking and archiving email messages and SMS messages.

According to one aspect of the present invention, a long code 302 is tied to an employee's standard phone number, and the long code 302 is promoted as the phone number for the employee, such as via a business card 320 (see FIG. 2). Instead of using the true phone number assigned by the carrier to the SIM card of the employee's mobile device, the long code 302 is published as the employee's phone number. A long code is a virtual phone number. Long codes are similar to standard phone numbers assigned to SIM cards by the carriers. There are companies that host long codes or provide long codes as their products/services. Such companies typically offer long codes for SMS chat or virtual phone numbers for Voice over IP or VoIP. Short codes are special numbers that are assigned through aggregators to business for the purpose of SMS communication. The number of digits for short codes may vary at different times and/or different countries. Today, typically the length of a short code in the USA is 5 or 6 digits. Although there are 3-digit or 4-digit short codes, carriers typically reserve them for special occasions such as exclusive to carrier communications or special partners/circumstances such as critical message delivery.

Although both short codes and long codes may be used for sending and receiving SMS messages, there are some differences between them. Short codes are expensive and it would be cost prohibitive to assign a short code to every mobile phone in an enterprise. Short codes have larger throughputs and can process more messages per second. Furthermore, messages sent over a short code can be forwarded faster than messages on long code. In United States and many other countries, short codes are highly regulated by carriers and oversight entities such as the Mobile Marketing Association or MMA. Short codes are typically used for purposes such as mobile marketing or alerts where messages are broadcasted from computers to many mobile devices. In the United States and many other countries, long codes are prohibited for tasks such as mobile marketing or alerts and are not allowed to be used instead of short codes. In such markets, long codes are typically allowed for tasks such as chat between mobile devices. Long codes have also been offered as virtual phone numbers for VoIP communication. In such cases, the virtual phone number is assigned to a user. Hence dialing the virtual phone number will forward the voice traffic to the user's computer, tablet or phone. In such cases, there is no correlation between the virtual phone number and the actual phone number of the mobile device assigned by mobile carrier. In another words, the phone number is assigned to the user rather that the mobile device of the user. In other cases, the phone number can be associated with specific enterprise application software (EAS).

A long code is similar to a short code in terms of SMS functionalities. The length of the long code, however, is typically the same as standard phone numbers. For example, in the United States, long codes are 10 digits. According to one aspect of some embodiments of the present invention, when a mobile user sends a message to a long code (or short code) that is assigned to a business (Mobile Originated or MO), the carrier receives the message via a carrier mobile network and routes that message to a communication gateway, such as an SMS gateway of the business or an aggregator that provides aggregation services to the business.

The gateway can reside, for example, within the data center of the business or in the cloud. The carrier can use the Internet or other networks to send the message to the gateway. Next, the gateway delivers the message to the recipient business. In most cases the gateways are used for business-to-consumer marketing. In such cases, the gateway is provided by an aggregator that routes the messages or communication between subscribers of the carriers and businesses that are customers of the aggregator. In such cases, the business may be considered a content provider and the mobile subscribers may opt-in to receive the contents. In other embodiments, when the business sends a message to a mobile user phone number (Mobile Terminated or MT), the message is delivered to a communication gateway, such as an SMS gateway which routes the message to the carrier. In turn, the carrier uses the carrier mobile network to send the message to the mobile user's device. In some embodiments, there are multiple communication gateways involved in routing of the messages. In other embodiments, the message can be an SMS type message, a data type message (such as IPSMS which are messages that are sent over a data channel instead of an SMS channel) or a voice communications.

Exemplary System Embodiments

Figure 1A:
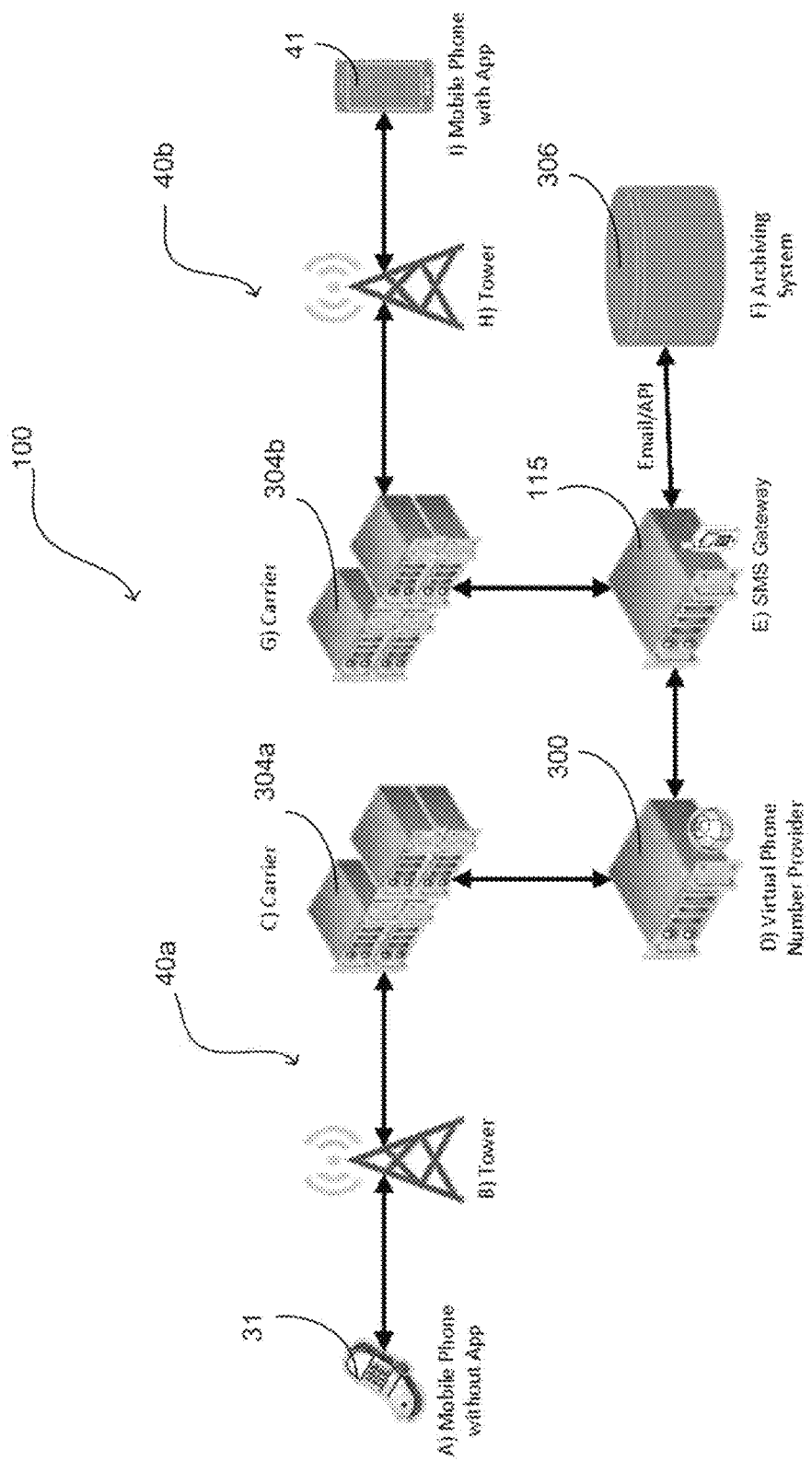
FIG. 1A is a block diagram illustrating one embodiment of a system that can be used for tracking and archiving messages in accordance with the invention, which can be used for tracking and archiving SMS messages and voice communications.
Figure 1B:
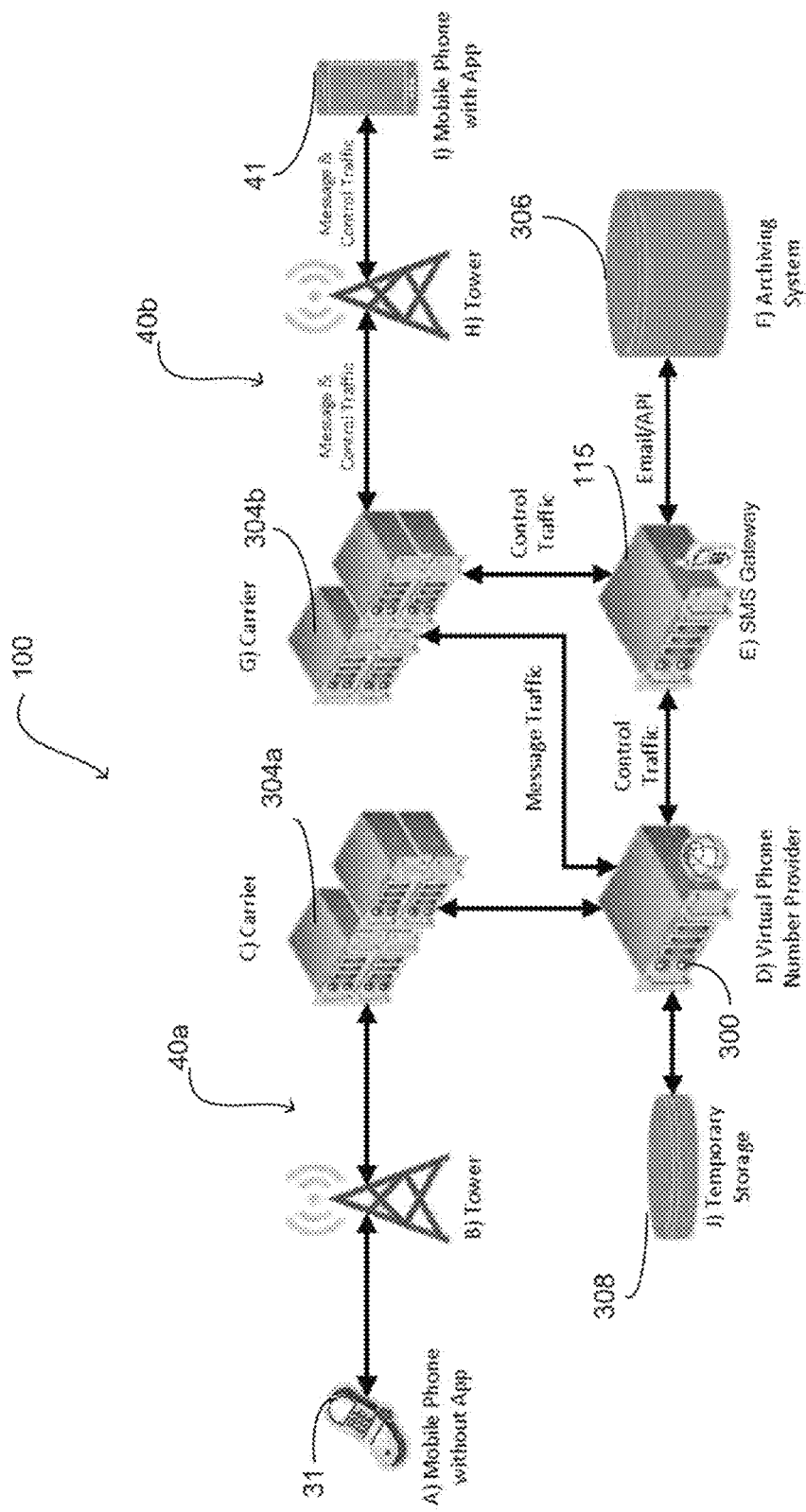
FIG. 1B is a block diagram illustrating another embodiment of a system in accordance with the present invention, which can be used for tracking and archiving messages SMS messages and voice communications.

Referring to the examples of FIGS. 1A and 1B, a system 100 that can be used for tracking and archiving messages in accordance with the invention includes mobile devices 31 and 41, such as mobile phones, which are serviced through mobile phone networks 40a, 40b in communication with one or more carriers 304a, 304b, respectively. It will be understood that the mobile devices 31 and 41 serve as examples of a larger number of mobile phones. The mobile devices 31, 41 and can send messages to carriers 304a, 304b, respectively. Carriers 304a, 304b are in communication with a communication gateway 115, which is in communication with an archiving system 306. As shown in FIG. 7, the gateway 115 can run on a server 15 and can communicate with carriers 304 and the phone network 40 via the Internet 10. A virtual phone number provider 300 also can communicate (e.g., via the Internet 10) with one or more of the carriers 304 and with the gateway 115.

With the embodiment of FIG. 1A all messages between mobile phones 31 and 41 are routed through the gateway 115. Although the gateway 115 is referenced in FIG. 1A as an SMS gateway, it will be understood that the gateway 115 need not be limited to an SMS gateway but can be a communication gateway that can handle other types of communications such as IPSMS, chat, text messaging, Multimedia Messaging Service (MMS), voice, video, email, or other types of digital or analog communications used for text, voice, video and multimedia. Accordingly, the gateway 115 can send messages to the archiving system 306 via email or API. The virtual phone number provider 300 and gateway 115 can be operated by the same or different operators, at the same physical location, on the same network, share the same virtual machine resources, and/or run on the same system. Similarly, the virtual phone number provider 300 and gateway 115 can be on or in separate systems, networks or physical locations. Typically, the gateway 115 can be implemented in the cloud, on premises or as software as a service (SaaS). Similarly, virtual phone number provider 300 typically can be implemented in the cloud, on premises or as SaaS.

With the embodiment of FIG. 1B, all messages between mobile phones 31 and 41 are routed thorough the virtual phone number provider 300. However, all communication control is routed through the gateway 115. In other words, the gateway 115 controls, manages, authorizes and tracks the message flow. To achieve this, according to one example, the mobile device 41 registers with the gateway 115 before sending messages. Next, the gateway 115 communicates with the virtual phone number provider 300 to exchange a security token that authorizes the mobile device 41 to route messages through the virtual phone number provider 300. In turn, the gateway 115 sends the security token to the mobile device 41, which authorizes the mobile device 41 to route messages through the virtual phone number provider 300. Once so authorized, the mobile device 41 can communicate with another mobile device 31. With the embodiment shown in FIG. 1B, the virtual phone number provider 300 can store the messages locally in temporary storage 308 and transfer the saved messages to the gateway 115 at a later time. In turn, the gateway 115 can then send the saved messages to the archiving system 306, e.g., via email or API.

FIG. 2 illustrates an exemplary system 100 that can be used for tracking email messages in accordance with the invention. In the embodiment of FIG. 2, an email client on the mobile device 41 can be used to communicate with the carrier 306b, which is in communication with the gateway 115 via an email gateway 310 and an email-to-message relay 312. As shown in FIG. 2, any or all of the email gateway 310, the email-to-message relay 312 and the gateway 115 can send messages to the archiving system 306. Also, it will be understood that any or all of the email gateway 310, the email-to-message relay 312 and the gateway 115 and the virtual phone number provider 300 can run on the same server or different servers.

Still referring to FIGS. 1-2, the gateway 115 is used to receive and send messages. In some embodiments, the gateway 115 is a full feature gateway that can receive messages sent from a mobile device to a long code (or short code). Such messages are referred to in the industry as Mobile Originated or MO. The gateway 115 also can send messages to a mobile device. Such messages are referred to as Mobile Terminated or MT. In the case of MO, the mobile device sends the message to a long code, which is routed to the gateway by the carrier (either directly or through other gateways). In the case of MT, the gateway sends the message to the carrier of the mobile device using the long code (either directly or through other gateways), which is then transmitted to the mobile device. To the user of the mobile device, the message is received from the long code. Hence, if the long code is promoted as an employee's phone number, the recipient of the message would think the message is coming from the employee's mobile phone. In fact, if the recipient of the message has the long code associated with the name of the employee of an organization in the mobile device contact list, as is the case for regular numbers today, the recipient's mobile phone typically shows the employee's name and/or name and phone number as the sender of the message. When the user replies to the message, received from a long code, the MO can be pushed from the gateway to a secure mobile application (or "app") 201 residing on the employee's mobile device (sometimes referred to herein as SecureSMS or SecureVoice Micro Client). The message may use the user's name, phone number and/or other information to indicate the user as the sender of the message. When the employee replies to the message, the mobile application 201 sends the message to the gateway 115 which associates the mobile application 201 to the long code. Hence the employee's messages are sent from that long code. At the gateway 115, the message is also sent to the archiving system 306. Most companies use email archiving systems such as HP Autonomy, Global Relay, ArcMail, IBM Content Collector, Smarsh or Symantec Enterprise Vault. For a more comprehensive list of such products, please see Gartner Magic Quadrant for Enterprise Information Archiving at http://www.storagenewsletter.com/rubriques/market-reportsresearch/gartner-magic-quadrant-for-enterprise-information-archiving. Such archiving systems are typically used for eDiscovery and are capable of archiving email communication within the enterprise. Hence the gateway 115 can email the message to the archiving system 306 or use an API to send the message to the archiving system 306. The gateway 115 furthermore manages the long codes. For example, long codes can assigned to mobile apps and can be tracked to prevent duplicate assignments. When a mobile app 201 has a long code 302 assigned to it, the term "dual persona" can be used to describe the status of mobile device. Furthermore, more than one long code can be assigned to a given mobile app 201. In such cases, the mobile app 201 has multiple personas, meaning that the mobile app 201 can send messages from multiple numbers and can receive messages from multiple numbers. For example, the mobile app 201 can send messages in Japan via a long code in Japan and the messages in the United States will go through a US long code. Similarly, the mobile app 201 can communicate with many countries through numbers that are local to the recipients in that country.

FIG. 5 illustrates communication channels linking an SMS server with a plurality of subscriber (e.g., employee) mobile devices, a customer (non-subscriber) device, customer application servers, an administrator/operator portal and the archiving system 306. As shown in FIG. 5, in cases, the communication is between two or more separate subscriber phones 41. In many cases the communication is between two or more subscriber phones 41 and non-subscriber phones 31. Yet in some cases the communication is between two or more non-subscriber phones 31. The communication can be SMS, IPSMS, voice, MMS, Email, instant messaging or video. In some embodiments, the communication can be between one or more subscriber phones 41, non-subscriber phones 31 and enterprise application software (EAS) modules connected to the gateway 115 via API integration. Such EAS modules may use any number of communication protocols to communicate with gateway 115. Some examples of such protocols are HTTP/HTTPS/TCP/IP/SMTP/SMPP/XMPP/FTP/SFTP and SNPP. There are many other computer protocols that can be use; some of these are listed at https://en.wikipedia.org/wiki/Lists_of_network_protocols.

Still referring to FIG. 5, the enterprise application software can be any type of computer software that is used to satisfy the needs of an organization. Amongst others, EAS can be computer software used for accounts receivable, accounts payable, stock and/or bond management, checking and/or saving account, inventory control, credit and/or debit card management or any other type of software that is used in industries such as airlines, banking and finance, manufacturing, technology industry and more.

When communicating between any number of subscriber phones 41, non-subscriber phones 31 and/or EAS modules, all communication traffic is managed and routed through the gateway 115, which is also in communication with the archiving system 306 (either directly or through third party vendors). Hence all communication (a copy of all communication) is transmitted to the archiving system 306. The transmission may be real time (meaning while the communication is taking place) or store and forward (meaning a copy of the communication (data) is first stored and then transmitted at a later time). The copy of the communication may be transmitted in one or more formats. For example, the gateway 115 may transmit the data in XML, JSON, CSV, Microsoft Excel, or other formats. Similar to Enterprise Application Software, the archiving system 306 may use any number of protocols to communicate with the gateway 115, including but not limited to HTTP/HTTPS/TCP/IP/SMTP/SMPP/XMPP/FTP/SFTP. Furthermore, the copy of the communication may be encrypted or compressed prior to transmission.

In some embodiments additional metadata in regard to the communication may be generated in order to facilitate the preserving, searching, reviewing and producing communication for electronic discovery. Metadata is data that describes other data. Metadata may summarize basic information about a communication, which can make finding and working with particular instances of data easier. Some examples of metadata are date and time of communication, length of communication, name of participants, type of communication and more. In some embodiments, when a communication is a group chat (group message conference) or voice conference, the metadata may include who is in the conference, or who joined the conference or who left the conference. Such metadata may further include date and time of joining or leaving the conference. Some metadata may include header information about the communication such as name of the conference, purpose of the conference and more. For the purpose of clarity, group message conference is a type of group chat that follows some of the features of the voice conference calling. For example, participants can be invited to attend the conversation. In some embodiments, the creator of the message conference is the moderator and has special privileges such as adding participants, removing participants and dissolving the message conference. The participants may leave the message conference, or join message conference. The message conference may have subject line that is defined at the time the message conference is created. In some cases, the participants can see who is currently attending the message conference and in some cases, when a participant joins or leaves the message conference, others are notified. For example when Joe Smith leaves, other participants may receive the message "Joe Smith has left the conversation". In another example, when Joe Smith joins the conversation, other participants may receive the message "Joe Smith has joined the conversation." All events of the message conference are recorded by the gateway 115 as metadata for the conversation. Hence the gateway 115 is able to determine the participants that are present in the conversation for any communication. Furthermore, the gateway 115 tracks the metadata for the sender of the message and recipients of the message, as well as the acknowledgements such as message received by the gateway 115, message sent to the recipient by the gateway 115, message received by the recipient, message opened by the recipient, message deleted by the recipient, message forwarded by the recipient and other types of acknowledgements that may be a proof positive for showing the exact status of the message.

Furthermore, in some embodiments, prior to transmitting the data, the communication (copy of the communication data) may be reformatted such as by splitting, separating, adding tags or recording in multiple channels, which further facilitates the preserving, searching, reviewing and producing communication for electronic discovery. The metadata may pertain to the reformatted communication. For example the metadata may pertain to splitting, separating, adding tags or multichannel recording of the communication. In such scenarios the communication is first reformatted (for example splitting, separating, adding tags or multichannel recording), then metadata is generated for the reformatted communication. In some embodiment the communication is reformatted to make it feasible for the archiving system 306 to digest, merge or import the communication. For example reformatting of the communication may be required (for example additional tags) to make the process of importing the communication into the archiving system 306 feasible or easier. Some examples of such tags include a keyword, symbol, attributes of the communication or the whole or a portion of the communication itself, which can help archiving system 306 to understand how to preserve, search and/or produce information. The transmission of the communication to the archiving system 306 may consist of transmitting one or more of the communication itself, a copy of the communication, metadata, reformatted communication, tags or any combination of thereof.

One simplified example of such reformatting is as follow:

```
<ArchivingDate>November12, 2015</ArchivingDate>
<MessageConferenceID>123456</MessageConferenceID>
<Participant>Joe Smith</Participant>
<Participant>Bob Jonson</Participant>
<Participant>Anna Davis</Participant>
<MessageSender>Bob Jonson</MessageSender>
<MessageID>789</MessageID>
<MessageBody>Hello everyone</MessageBody>
<MessageDate>11/12/2015:08:31:01</MessageDate>
<MessageDelivery>Anna
Davis/MSGID:789/MSGDATE:11/12/2015:08:31:02</MessageDelivery>
<MessageOpen>Anna
Davis/MSGID:789/MSGDATE:11/12/2015:08:31:03</MessageOpen>
<ParticipantJoined>Bryan
Brown/JOINDATE:11/12/2015:08:31:04</ParticipantJoined>
<MessageDelivery>Joe Smith/MSGID:789/MSGDATE:
11/12/2015:08:31:05</MessageDelivery>
<MessageOpen>Joe
Smith/MSGID:789/MSGDATE:11/12/2015:08:31:06</MessageOpen>
<MessageSender>Bob Jonson</MessageSender>
<MessageID>790</MessageID>
<MessageBody>I will not be in the office today</MessageBody>
<MessageDate>11/12/2015:08:31:07</MessageDate>
<MessageDelivery>Joe
Smith/MSGID:790/MSGDATE:11/12/2015:08:31:08</MessageDelivery>
<MessageDelivery>Anna
Davis/MSGID:790/MSGDATE:11/12/2015:08:31:09</MessageDelivery>
<MessageDelivery>Bryan
Brown/MSGID:790/MSGDATE:11/12/2015:08:31:10</MessageDelivery>
```

Many archiving systems are designed to preserve, search and/or produce information based on email formats. In such scenarios, the gateway 115 can reformat the communication to match an email format or create an output that matches what the archiving system 306 is capable of understanding. To do so, the communication can be formatted and/or tagged and/or metadata can be created that is suitable for import to the archiving system 306.

The process of reformatting, creating metadata, adding tags, encrypting, compressing, transmitting and any combination of thereof as described herein, is referred to as the "Upload Process". The Upload Process may or may not include the import into the archiving system 306. The Upload Process can be performed at the gateway 115 itself or as a separate process that is on the same network as the gateway 115 or a different network. Hence, for example, it is possible to first perform the process of reformatting, creating metadata and/or adding tags and then transmit the result for the import to the archiving system 306 or transmit first and then perform the process prior or during the import to the archiving system 306.

FIG. 16 illustrates another exemplary embodiment of a system 100 for tracking communications in accordance with the invention, wherein the mobile devices 31 and 41 utilize native operating system's communication tools such as standard SMS editors and phone dial pads for making and receiving voice calls that are shipped with the device as part of the operating system. Such native operating system tools may include iMessage or FaceTime Apps or any other Apps that are provided by the device manufacturer for the purpose of communication such as sending and receiving of messages (whether in the form of SMS or Instant Messaging), or for making or receiving of phone call, or video chats. In the embodiment of FIG. 16, the communication that may be utilizing the device phone number (phone number associated with the SIM card) to reach a carrier 304a, is forwarded to the gateway 115 from that carrier 304a. In turn, that communication is forwarded from the gateway 115 to the archiving system 306. For example, referring to FIG. 16, the communication from the mobile device 31 (which does not have the mobile application 201) is sent to the carrier 304a that is providing communication services to that mobile device. Such communication typically goes through the Circuit Switched Network, however in some embodiments it may utilize a Packet Switched Network. The carrier 304a routes a copy of the communication to the gateway 115, which in turn forwards it to the archiving system 306. In this scenario, the gateway 115 can have programming instructions to communicate with a variety of archiving systems. In some scenarios, the archiving system 306 may be hosted by the owner of the mobile device 31 (which typically is an enterprise or corporation but in some cases may be an individual), or hosted at the carrier 304a or some other carrier, or hosted at the same datacenter as the gateway 115, or hosted by a third party which may or may not be the manufacturer of the archiving system 306. It is understood, however, that at least one proper archiving system is associated with the mobile device 31. For example, the phone number for mobile device 31 can be defined at the carrier 304a or gateway 115 to associate with the archiving system 306. In this scenario, after the carrier 304a sends a copy of the communication to gateway 115, it continues with the processing of the communication as usual and forwards the communication to the mobile device 41, which in some cases may be by way of another carrier 304b that is providing communication services to the mobile device 41. In this example, neither mobile device 31 nor mobile device 41 is required to run any special application and could be utilizing the native communication tools that are provided by their respective operating systems. In some embodiments, however, either mobile device 31 or mobile device 41 or both can have a secure container on that mobile device. In some embodiments, the communication in the above example can come from inside a secure container. For example, the user of mobile device 31 attempts to establish communication with mobile device 41. Hence the user opens the contact list within the container and finds the contact phone number for mobile device 41 and initiates an SMS or voice communication. In this example, although the communication is initiated from the inside container but it will be using the device native communication tools.

In one specific example of the above embodiment, mobile device 31 sends an SMS or text message to mobile device 41. Mobile device 31 uses the standard SMS editor that is provided by the operating system of that mobile device. Hence the SMS message is transmitted through a carrier network (GSM or CDMA for example) to the carrier 304*a*. The carrier 304*a* routes the SMS message to the mobile device 41, and a copy of the SMS message is also transmitted to the gateway 115 for delivery to the archiving system 306. In this specific example, the phone number of the mobile device 31 is correlated to the archiving system 306. The correlation may be set at the carrier side or at the gateway 115. For example, the owner of the mobile device 31 can request the carrier 304*a* to forward a copy of all communication (SMS in this example) to and/or from mobile device 31 to be sent to the gateway 115 for archiving at the archiving system 306. Such request may be done through the gateway 115 and transferred to carrier 304*a*. It should be understood that all communications such as voice, messaging, SMS or email can be queued or stored at various points before transition to the next stage or transmitted in real time. For example, the carrier 304*a* may store all voice communication first and transmit the entire commutation to the gateway 115 after the voice communication is completed. In other embodiments, the carrier 304*a* may forward a copy of the voice communication to the gateway 115 in real time and while the communication is in progress. In some embodiment the carrier 304*a* may create a file containing a copy of the communications at specific intervals which can then be transferred to the gateway 115 by way of communication protocols such as HTTP, HTTPS, FTP or SFTP. In some embodiments, the carrier 304*a* may send an email containing the content of the communications to the gateway 115. In such scenarios the gateway 115 has the programming instructions to capture the email sent by the carrier 304*a* and to extract the content of the communication, obtain information about the communication, or reconstruct the communication. Similarly, the gateway 115 may store and forward the communication or transmit the communication to archiving system 306 in any of the methods described above for carrier 304*a* and gateway 115.

In some embodiments, the PBX, VoIP PBX or IP PBX (collectively referred to herein as PBX) of the enterprise can be used for routing of the voice or message communication. Many enterprises have a PBX system that is used for voice communication. Typically, the PBX has communication lines, in the form of T1, E1 or ISDN for example, for connection to public telephone network or PSTN. In most scenarios, a list of DIDs or phone numbers are assigned to the PBX, which are used for making outbound calls or receiving inbound calls to the enterprise. In some embodiments the gateway 115 can utilize the DID of the PBX to make an outbound call or receive an inbound call. In this scenario, when a voice call is received by the gateway 115 from secure mobile module 201, the gateway connects to the PBX and utilizes the DID associated with mobile module 201 to make an outbound call. Similarly, when an inbound call is received by the PBX for the DID number associated with mobile module 201, the PBX utilizes the gateway 115 to send the call to mobile module 201. In typical scenarios, the gateway 115 sends a copy of the communication to an archiving system 306 before sending to or after receiving from the PBX. Additionally, the DIDs can be SMS enabled, which means any SMS sent to such DIDs (Mobile Originated or MO) are ultimately routed (by carriers or telecom companies) to the gateway 115. Consequently, the gateway 115 can utilize such SMS enabled DIDs to send out an SMS message (Mobile Terminated or MT). In such scenarios, When module 201 sends an outgoing message, gateway 115 utilizes the DID number associated with mobile module 201 to send out an MT SMS message. Similarly, when an MO SMS message is sent to the DID, the gateway 115 sends the message to the mobile module 201 associated with that DID number. In typical scenarios, the gateway 115 sends a copy of the communication to an archiving system 306 before sending to or after receiving from the mobile module 201.

In some embodiments, the gateway 115 can determine whether the incoming communication for a subscriber (mobile phone 41) is forwarded to the enterprise PBX or the mobile phone 41 based on the location of the phone 41. For example, if the subscriber is within certain vicinity or an area of interest, the voice calls are forwarded to the enterprise PBX, whereas if the subscriber is elsewhere, the phone calls are forwarded to phone 41. In other embodiments, the communication can be forwarded to both to the enterprise PBX or subscriber's mobile phone 41 at the same time. In such scenarios, the gateway 115 can stop routing the communication to one or the other once the subscriber has been reached (for example the call or video conferencing request has been answered or gone to a voicemail).

In some embodiments the gateway 115 can determine if the mobile phone 41 is able to receive communication via a mobile software application 201 (mobile app). In another words, when the mobile device 41 has the correct mobile app 201 installed and the mobile app 201 is properly configured and registered to communicate with the gateway 115, then the gateway 115 can determine if a copy of the mobile app 201 is installed on the mobile device 41.

In some embodiments, more than one virtual number may be assigned to the mobile application software 201 that is running on the mobile device. The mobile application software 201 can be within a container (i.e., installed inside a container) which provides a secure or managed segment for business data on a personal mobile device. When a communication is initiated from a subscriber mobile device 41 to a nonsubscriber mobile device 31, while more than one virtual number is assigned to the mobile App, either the gateway, mobile App or the user of the mobile device has to select a virtual number for transmitting the communication from the gateway 115 to the nonsubscriber 31. With such an embodiment, the selection can be made by determining the country of the nonsubscriber 31 and selecting a virtual number that matches such country. For example, considering the phone number of a nonsubscriber device 31 and determining its country code and selecting a virtual number that has the same country code. Similarly, the area code of the nonsubscriber mobile device 31 may be used to select a virtual number with an appropriate area code. In some embodiments, the virtual number can be selected based on region (for example closest) or price (for example least expensive communication) or the route (for example most reliable).

In some embodiments, previous communications with the nonsubscriber mobile device 31 can indicate the appropriate virtual number. For example if the nonsubscriber mobile device 31 has previously called or sent a message on one virtual number, the system can select that virtual number for future communication between the subscriber 41 and nonsubscriber 31.

Although the selection can be done automatically by the gateway 115 or the mobile application software 201, it can be overridden by the user of the mobile device. For example, the user of the mobile device can preselect the virtual number that will be used for communication with the nonsubscriber 31.

Archiving of Voice Conversations

According to one aspect of the invention, a conversation that includes voice communications of multiple parties can be transcribed and archived. Transcription is the process of putting a voice communication into a written format. In some embodiments, each party's voice is recorded separately. The separate recording of the voice communication can include, audible, readable, visual or other type of tags. In some embodiments tags can signify the timeline for the communication. The separately recorded voice communications (with or without the timeline tags) can be transcribed. The timeline tags can be used to combine one or more of the separate voice communication recordings to constitute the entire communication. For example, if a conversation includes voice communications between a user of a subscriber mobile phone 41 and a user of a non-subscriber mobile phone 31, the voice communication for the non-subscriber mobile phone 31 can be recorded without the voice communication of the subscriber mobile phone 41. Similarly, the voice communication from the subscriber mobile phone 41 can be recorded without the voice communication of the non-subscriber mobile phone 31. While being recorded, each recording can be tagged for conversation timeline. Each recording can be used to transcribe that caller's communication. In this manner, the voice communications between mobile phone 31 and mobile phone 41 are reformatted into a written format, which can be beneficial in preserving, searching, reviewing and producing communication for electronic discovery. This process can be applied to voice communication taking place between any number of phones 31, 41 and/or EAS modules.

In some embodiments when a communication is initiated or received by either (or both) subscriber mobile phone 41 and nonsubscriber mobile 31, a notification can alert the initiator or recipient about certain features of the system, a disclaimer or legal rights. For example, when a text message is sent from a nonsubscriber phone 31 to a subscriber phone 41, the nonsubscriber may receive a message describing the archiving feature of the system. In a similar example, when a subscriber phone 41 sends a message to the nonsubscriber phone 31, a disclaimer or signature maybe added to the message (for example to the top or bottom of the message) stating that messages are being saved. In another example, if a subscriber is making a voice call to the nonsubscriber, once the call is taken, a message will notify the nonsubscriber that the conversation is being recorded. In yet another similar example, if a nonsubscriber makes a voice call to a subscriber, before the subscriber takes the call, the nonsubscriber will be notified that that the conversation is being recorded.

Use Cases

The following examples help to explain the use of the system and method of the present invention.

The ABC agency deploys the secure mobile application 201 to its users (i.e., subscribers) then disables all other messaging applications including SMS. Each user is provided a virtual phone number 302. In some cases, the users may have one or more virtual numbers 302, for example since they are working in Canada or the UK. The users (i.e., employees or agents of ABC company) use the various embodiments of the invention to communicate with ABC company customers that are not using the secure mobile application (see, e.g., FIG. 6). These customers dial the subscribers' virtual numbers, which routes the call to the native cell number of the phones registered to the secure mobile application 201.

Long codes are used as virtual phone numbers for routing communications, such as SMS messages or voice, that take place between a non-subscriber's (e.g., a consumer's or customer's) phone and a subscriber (e.g., an employee). It is assumed that the non-subscriber is using the standard SMS and voice capabilities that come with the mobile phone while the subscriber has an application such as a secure mobile app or email (which are described in more detail below) on their phone.

Referring to FIGS. 1A and 4-6, one exemplary process may go as follows:

1. From the phone 31, a non-subscriber (e.g, consumer) originates an SMS message (could be IPSMS) or phone call to a virtual number that is assigned to the subscriber (e.g., employee);
2. The server 15, which includes an SMS gateway 115 or PBX, such as Asterisk, receives the SMS message or call and recognizes that the non-subscriber is trying to reach a subscriber that has the secure mobile application 201 on their phone 41. This may be done by searching a database to determine if the virtual number is assigned to any the secure mobile application 201. The SMS message or call is logged. The message can be logged both locally and sent to a remote archiving system 306. Also, the logging process can include queuing system to assure resiliency since the remote archiving system 306 may not be accessible at all times. Furthermore, a reporting system can be used to sync the local storage with the remote system 306. In such cases, any missing messages are sent to remote system from local storage or the queue based on a user specified criteria;
3. The server 15 detects the non-subscriber's phone number by detecting the originator of the SMS message or using the caller ID;
4. The server 15 forwards the call to the secure mobile application 201 showing the non-subscriber's phone number as the originator (sender). It is possible that the non-subscriber's call is received by the server 15 as unlisted or unknown or that the server 15 or PBX in the server, is unable to detect the non-subscriber's caller ID. In such cases, the secure mobile application shows the originator of the call as unlisted or unknown. When sending an SMS message from a computer, it is possible that the SMS message is sent without the originator's phone number. It is also possible to send an SMS message that carries an ID such as text instead of the originator's phone number. In either case, the secure mobile app will show the ID received by the server 15 as the originator.

Still referring to FIGS. 1A and 4-6, another exemplary process may go as follow:

1. A subscriber (e.g., an employee) originates an SMS message (could be IPSMS) or a call to a non-subscriber (e.g. a customer or consumer) using the secure mobile application 201 on the mobile device 41.

2. The server 15, which includes an SMS gateway 115 or PBX, such as Asterisk, receives the SMS message or call and recognizes that the SMS message or call is intended for an external number (i.e., a non-subscriber's number). An external number could be any phone number that is not assigned to a secure mobile application 201. The server 15 can search a database to determine if the recipient of the message/call is another secure mobile app 201 or is a non-subscriber's mobile phone 31. The server 15 routes the SMS message or call to non-subscriber's 31 phone using the subscriber's virtual number as the originator. The SMS message or call is logged.

3. The non-subscriber receives an SMS message or a call on his or her mobile phone 31 showing the virtual number as the originator. If the virtual number is assigned to a name in the non-subscriber's contact list, the non-subscriber's phone 31 can show the subscriber's name as the sender of the SMS message or caller ID.

Referring to FIG. 2, in some embodiments, a message is sent to the email server 310 from an email application on the subscriber's mobile device 41. The subject field, body of the email or email address for the recipient of the email can identify the phone number of a non-subscriber's mobile device 31 that is the recipient of the message. For example the recipient email address may be in the form of 1234567890@domain.com where 1234567890 is the phone number for the recipient of the message. As another example, the subject field or body of the email can contain the phone number 1234567890. The email server routes the message to the communication gateway such as an gateway 115. The communication gateway 115 or the email server may record the message for reporting, compliancy and archiving and then the communication gateway 15 use a long code to send the message to the second mobile device.

Still referring to FIG. 2, a message can be sent from the non-subscriber's mobile device 31 to a long code. The long code routes the message to a communication gateway such as the gateway 115. The gateway 115 utilizes an email server 310 to email the message to the subscriber's mobile device 41, which has an email client and is the intended recipient of the message. The subject filed, body or email address for the sender of the email can represent the phone number for the non-subscriber's mobile device 31. Furthermore, the subject field or body of the email can represent the content of the message sent from the non-subscriber's mobile device 31.

In some embodiments, one or more other servers can exist between the subscriber mobile device 41, email server 310, communication gateway 115 and non-subscriber mobile device 31.

Figure 3:
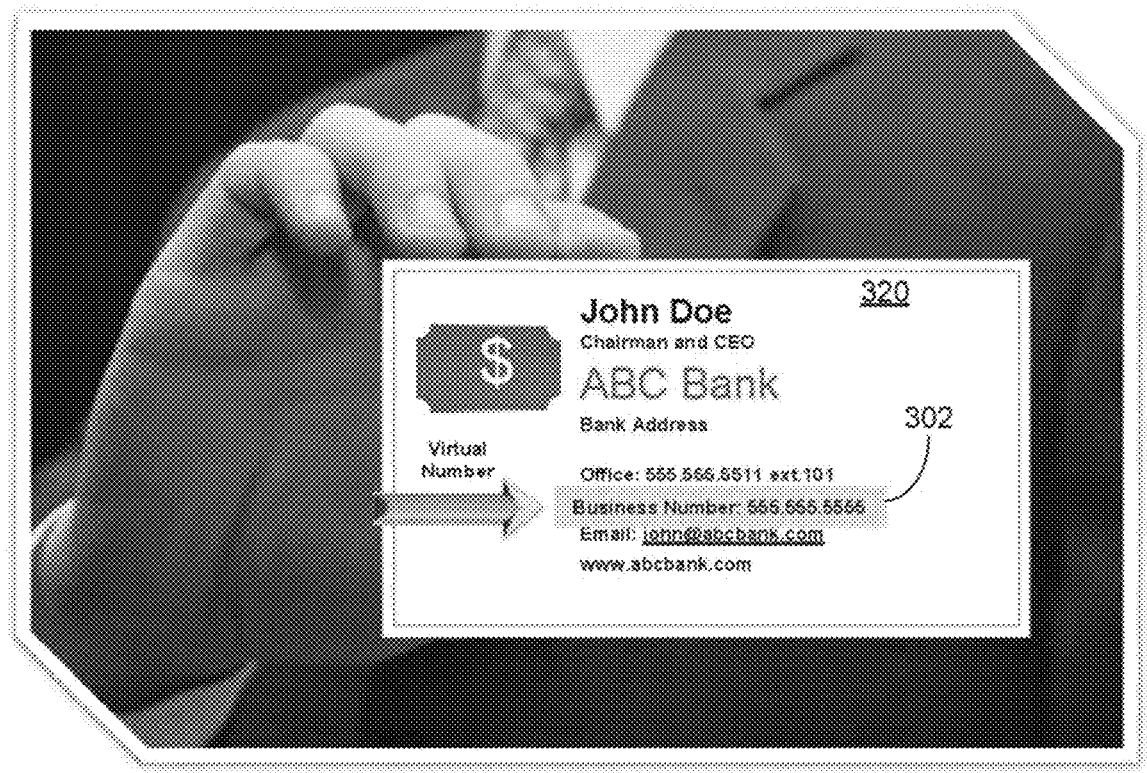
FIG. 3 illustrates an example of a business card for promoting a long code (virtual number) as a text messaging telephone number of an employee, according to some methods of the invention.
Figure 4:
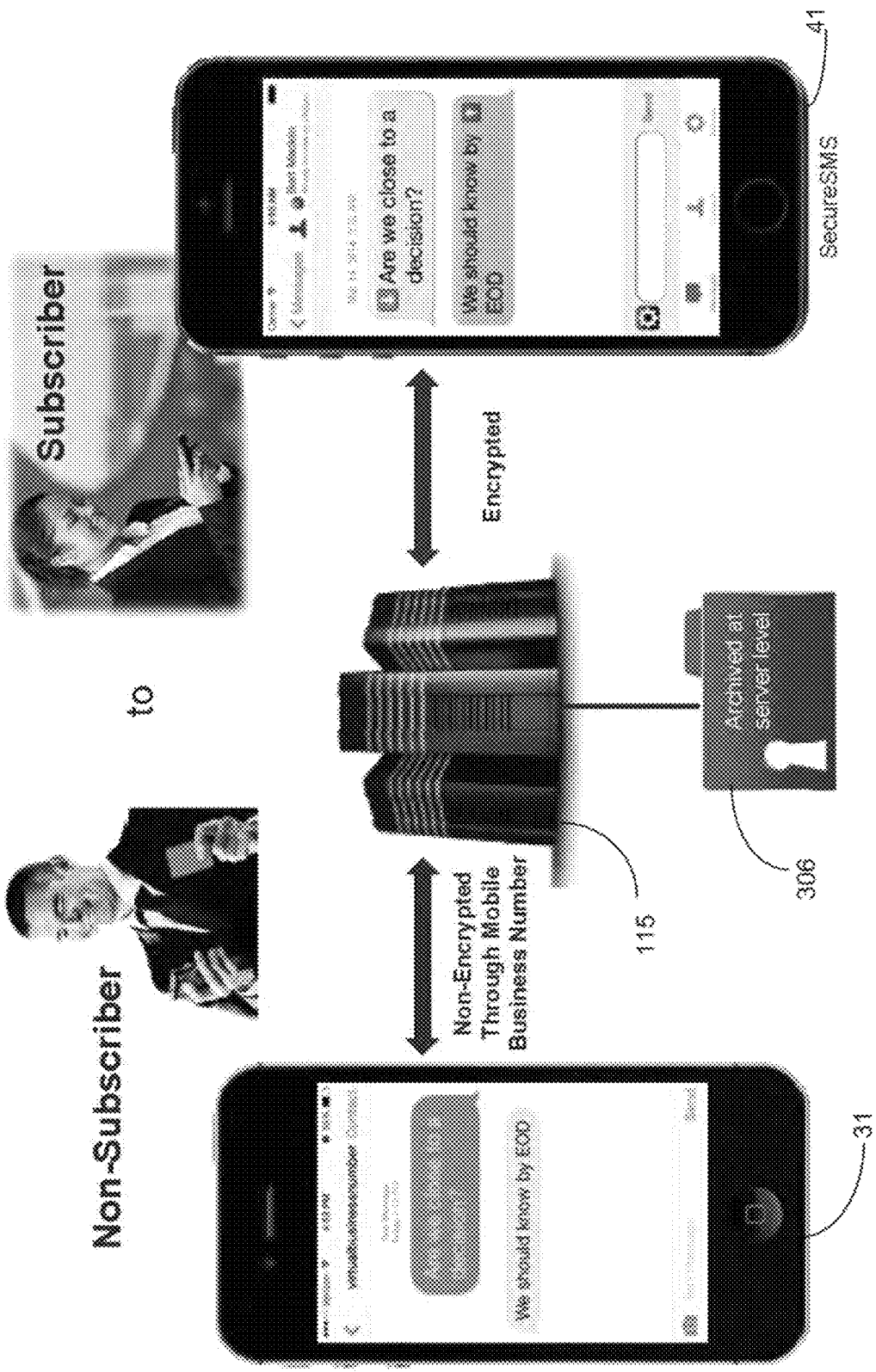
FIG. 4 is a block diagram illustrating communication of SMS messages between a subscriber's (e.g., employee's)

Still referring to FIG. 2, the email client can be inside a container (discussed below) on the subscriber's mobile device 41. The long code can be assigned to the subscriber's mobile device 41 with the email client. The user of the mobile device 41 can represent the long code as his or her own mobile phone number, personal number, SMS number or other related numbers. As shown in FIG. 3, the long code can be printed on a business card 320 as such numbers.

The email client can be a SecureSMS or SecureVoice Micro Client or other mobile app. In such embodiments, the app on the mobile device 41 can send the message directly to the communication gateway without going through any email server. Yet again in such embodiments the message may be a voice or VoIP. In many embodiments there can be multiple communication gateways involved to route the message. In most embodiments the communication gateway sends the message to a carrier. The carrier can use a mobile network to transmit the message between the communication gateway and mobile device. The sender and recipients can be on different carriers. In such embodiments the carrier of the sender transmits the message to the carrier of recipient.

In some embodiments the message can have attachments. In such embodiments the attachment may be other messages or multimedia files.

Containerization for Mobile Devices

Containerization for mobile devices (such as Samsung Knox) allows a mobile device to be shared for both personal use as well as corporate use. Using this technology the personal applications and personal data for the user of the phone may coexist with corporate applications and data on the same mobile device. Hence a mobile device may be running personal applications and personal data on the phone while the container creates a secure and managed segment for corporate applications and data. However, with containers the mobile device is still using the same phone number for communication. This means the user sends and receives messages or voice communication for both personal and corporate using the same number.

Although it is possible to have two or more SIM cards in a single mobile handset, the cost of such is typically higher than having a single SIM in the device. A virtual number can be assigned to the container on the device. This allows a phone to have one number such as the original number (assigned by the carrier to the SIM card) for the phone itself, and another number such as the virtual number for the container. Hence the phone may recognize which communications are intended for the applications inside the container. For example, a mobile device may have phone number A assigned to the phone by the carrier and virtual number B assigned to the applications on the container. The phone may have one set of applications installed on the phone and the same or another set of apps installed inside the container. Hence when receiving communication destined for number A, it is forwarded to apps on the mobile device while communications destined for number B are forwarded to apps installed in the container. It is important to note that the secure mobile app 201 can be installed both inside and outside the container on the phone. It such cases, it is possible to assign one or more virtual number to both sides which would lead to receiving messages on the phone itself, the secure mobile app outside the container as well as the secure mobile app inside container.

Secure SMS and Mobile Voice Communication System

FIGS. 7 through 15 illustrate in more detail an exemplary system and methods for managing SMS and mobile voice communications in an encrypted and secure manner, with which various embodiments and methods of the invention can operate. Various environments of the system described herein are illustrated for use with a short messaging service (SMS) protocol. However, other protocols, for example, a multimedia messaging service (MMS) protocol, an Unstructured Supplementary Service Data (USSD) protocol, or other messaging protocol, and/or the like may suitably be employed. Moreover, various embodiments described herein are suitable for use when a messaging protocol is utilized for at least a portion of the communication. System 100 is, among other things, an example of a network-based system configured for managing information that is transferred to, transferred from, and/or stored on a mobile device, which is accomplished in many embodiments while maintaining an acceptable level of data security. In the example of system 100, users 21, 22, and 23 own, use, control, or have access to mobile phones 41, 42, and 43 respectively, which are serviced through a network, for example mobile phone network 40. Although one mobile phone network 40 is shown, some embodiments may include or use a number of mobile phone networks 40, which may be interconnected, for example. As used herein, unless specifically stated otherwise, a "mobile phone network" may be a cellular network, a satellite network, a WiFi network, a WiMAX network, a wireless network, or any other suitable network for transmission of information to mobile phones and/or other mobile devices. Moreover, a mobile device may connect to a network in any suitable manner, for example via a GSM modem, a CDMA modem, and the like. Additionally, a mobile device may connect to multiple networks simultaneously, for example to a GSM network of a first carrier via a GSM modem, and to a CDMA network of a second carrier via a CDMA modem. Further, the three users 21 to 23 and mobile phones 41 to 43 shown may serve as examples of a larger number of users and mobile phones. Many users of system 100 may have access to the Internet 10. For example, in various embodiments, user 23 has access to the Internet 10 through personal computer 13. Further, in certain embodiment, mobile phone network 40 is in communication with the Internet 10, or information is capable of being communicated (e.g., in one or both directions) between mobile phone network 40 and the Internet 10. In various embodiments, mobile phone network 40 may be connected to one or more additional mobile phone networks 40 or other networks in any suitable manner, for example via the Internet 10, via a public switched telephone network (PSTN), and/or the like.

Moreover, system 100 may be a public system (e.g., a system wherein any number of users may utilize system resources) or a private/closed system (e.g. a limited-access system with a "circle of trust" such that a user must be authorized to utilize particular system resources and/or send and receive communications with other members of the circle of trust). In various embodiments, system 100 may be configured to allow communication only between users (for example, users 21, 22, and 23) who are members of a particular trusted group. In this manner, system 100 may be particularly suitable for businesses, military, law enforcement, governments, and the like, who wish to exchange highly sensitive and confidential information via system 100. For example, system 100 may be configured to enable communication only between members of a pre-defined trusted group, such as FBI agents, ATF agents, Army personnel, and the like.

In the embodiment illustrated, server 15 is in communication with the Internet 10. However, server 15 may be in communication with a wireless carrier, a private network, a mobile phone, another server, and/or the like, via a wireless network or other means such that server 15 does not need to be in communication with the Internet 10. In this embodiment, server 15 is part of system 100, which provides an example of a system of managing personal information for a plurality of users (e.g., 21 to 23), each user having a mobile phone (e.g., 41 to 43) operating on a mobile phone network (e.g., 40). In this example, system 100 includes, on server 15, (at least one) first software module 61. Although shown just on server 15, in some embodiments, module 61 may be installed on or operating on more than one server. In certain embodiments, software module 61 may form at least one website 65. In this embodiment, at least a plurality of users (e.g., 21 to 23) may access or visit website 65 through the Internet 10 and elect to have their personal information managed through system 100 using their mobile phones (e.g., 41 to 43). For example, user 23 may access website 65 through computer 13 and internet 10. In different embodiments, computer 13 may be a desk top personal computer, a lap top or notebook computer, a PDA, etc. In some embodiments, users may access website 65 on server 15 through their phones (e.g., 41 to 43), through mobile phone network 40, or both.

In various embodiments, server 15 is part of system 100, and server 15 is configured as a trusted gateway configured to manage encrypted messages. Server 15 may provide any desired functionality to system 100, for example managing client software installed on one or more mobile devices, updating client software installed on one or more mobile devices, issuing commands to client software, tracking messages sent and received by client software, and the like. Server 15 may also manage encryption keys for client software, generate new encryption keys, communicate with a hardware security module (for example, a module located on another server 15 coupled to the instant server 15), and provide resiliency to increase the reliability of message delivery.

System 100 further comprises, on server 15, (at least one) first software module 61. Although shown just on server 15, in some embodiments, module 61 may be installed on or operating on more than one server. For example, server 15 may include multiple servers, such as one or more of a firewall server, a database server, an gateway server, a web server, a domain server, or any other server. In certain embodiments, software module 61 may form at least one website 65. In certain embodiments, multiple users (e.g., 21 to 23) may access or visit website 65 (for example, through the Internet 10) and elect to send, receive, forward, reply, view, sort, and generate reports, including compliancy reports, through system 100 using their mobile devices or other communications devices. Moreover, one or more users may access or visit website 65 via any suitable protocol, for example WAP, https, and the like.

In some embodiments, first software module 61 provides secure storage 64 for each user's (e.g., 21 to 23) personal information, for example, received from the user. In a number of embodiments, storage 64 may also be used to store personal information about the users that has been received by module 61 or server 15 from at least one third party, which may be acting on behalf of the user to provide information to the user, for example. In the embodiment illustrated, third party 33 may provide such information to module 61 through the Internet 10, and third party 31 may provide such information to module 61 through mobile telephone network 40 and the Internet 10. In some embodiments, information that is communicated through mobile telephone network 40 may also, or instead, be communicated through a traditional phone network, for example, that provides direct wired phone service for a number of users.

In many embodiments, first software module 61 or module 201 (described below) provide secure storage 64 for each user's (e.g., 21 to 23) personal information, for example, information received from the user, contents of sent and received SMS messages, and the like. In a number of embodiments, storage 64 may also be used to store personal information about the users that has been received by module 61, module 501, or server 15 from at least one third party, which may be acting on behalf of the user to provide information to the user. In certain embodiments, third party 33 may provide such information to module 61 or module 201 through the Internet 10, and third party 31 may provide such information to module 61 or module 201 through mobile telephone network 40 and the Internet 10. In some embodiments, information that is communicated through mobile telephone network 40 may also, or instead, be communicated through a traditional phone network, for example, that provides direct wired phone service for a number of users. Moreover, third parties 31, 32, and 33 can choose to deploy gateway 115 at their respective data center behind their firewall. This provides each third party with another layer of security. Each third party can manage all access to server 15 according to their internal security policy. All communication between gateway 115 and mobile phone network 40 (e.g., carriers) can be direct.

Module 201 may be self-updating (e.g., when a new software update is available, gateway 115 may send a message to module 201 informing module 201 of the available update). The user's (or third party's) phone is informed of the update (e.g., via a SMS or MMS message (e.g., formatted with a command)) and asked for permission to update module 201. For example, the message (e.g., formatted with a command) queries the user as to whether the user would like to receive the update. If the user accepts to receive the update, then module 201 terminates itself, starts a browser to access server 15 or gateway 115, and downloads the latest version of module 201 from server 15 or gateway 115. Thus, once permission is given to update module 201, the new version of module 201 is downloaded to the user's (or third party's) phone and installed over the old version of module 201. A message confirming installation of module 201 may be sent to gateway 115. Moreover, module 201 may be configured to communicate with and/or utilize multiple gateways 115.

In various embodiments, customized versions of module 201 may be provided in order to make module 201 operative and/or available for use on varying hardware, for example various mobile phones and/or computing platforms (e.g., Google Android, Java 2 Mobile Edition, Windows Mobile, Linux, Microsoft Windows, Mac OS, Unix, and the like). Moreover, access to module 201 may be controlled via a password, a biometric, and the like. Additionally, module 201 may contain and/or be associated with information configured to identify a third party (e.g., a reseller, a referrer, a corporation, and the like), in order to provide customized services and/or tracking. For example, a reseller may receive a commission based on the number of secure SMS messages transmitted by module(s) 201 associated with the reseller.

Registration with the Gateway/Server

Moreover, module 201 may be configured to utilize registration with a gateway, for example gateway 115. In various embodiments, registration may comprise a user taking affirmative steps, for example inputting a secure identification provided by a gateway administrator; inputting a short code, a long code, or a phone number (for example, a number associated with a cellular modem) to facilitate routing of one or more messages. Furthermore, registration may comprise exchanging encryption keys between a mobile device and a gateway. For example, a server public key may be utilized to securely send the encryption key of module 201 to a mobile device.

In certain embodiments, module 201 is registered on gateway 115 in order to facilitate communications between module 201 and gateway 115. For example, registration may be accomplished through use of a default server public key, a unique module 201 public key, a short code, and a unique secure identification code. In this manner, a module 201 may know how to contact gateway 115 in order to register. Module 201 encrypts the unique secure identification code and the newly generated module 201 public key with the default server public key and sends the result in an SMS message to the short code. Gateway 115 decrypts the SMS message using a default server private key. Gateway 115 verifies the unique secure identification code and the phone number associated with module 201. If the result is not verified, an error message is returned to module 201. If the result is verified, gateway 115 transmits a new server public key to module 201.

Gateway 115 then creates a unique AES key and sends this key, together with registration information, to module 201 via a registration message encrypted with the module 201 public key. Module 201 decrypts the registration message using module 201 private key. Module 201 then transmits a registration acknowledgement message, encrypted with a unique AES key associated with module 201, to gateway 115. Upon receipt of the registration acknowledgement message at gateway 115, module 201 is registered with gateway 115.

In some embodiments as illustrated in FIGS. 7 through 15, system 100 can manage mobile voice communications in an encrypted and secure manner. Some of the problems and vulnerabilities of mobile voice communications have been described. A network manager 1673 can be configured as a part of a fourth software module 1672 in FIG. 15, module 201 in FIG. 1, or second software module 72 or 77 (or separate from modules 1672, 72, and/or 77). Network manager 1673 acts as a module to measure network conditions on both sides (transmit/receive) of a call through mobile phone network 40. Network conditions can include latency, throughput, and bandwidth of mobile phone network 40. The data thereby collected by network manager 1673 is used to make informed decisions about choosing a more suitable codec for handling the call on mobile phone network 40. In some embodiments, fourth software module 1672 can be configured as one or more of a secure messaging module 201, second software module 72, a secure voice module, secure audio module, secure video module, secure video streaming module, secure video conferencing module, and secure multimedia module.

Referring now to FIGS. 7, 14 and 15, a system 100 for managing mobile voice communications in an encrypted and secure manner includes the second software module 72, the secure messaging software module 201, a fourth software module 1672, a network manager 1673, and a SIP module 1680. PBX 1690 is Private Branch Exchange, which is a PSTN telephone network (usually used within a private enterprise). The Internet 10 and mobile phone network 40 can be combined as Internet and/or a mobile phone network 40 (see FIG. 7). Fourth software module 1672 can be a part of secure messaging module 201 or second software module 72 in FIG. 7 or be separate from module 201 or second software module 72. Server 15, gateway 15, or the administrator of the server/gateway 15 can send or communicate a secure identification code or Secure ID to the user via fourth software module 1672, module 201, or second software module 72. The secure identification code can be communicated via SMS, MMS, and/or data, or via a communication channel other than SMS, MMS, and/or data.

Fourth software module 1672 (configured as an application on mobile phone 43), module 201 (configured as an application on mobile phone 43), or second software module 72 (configured as an application on mobile phone 43) can send a request to server 15 indicating an interest or a request to register with server 15 (step 1603). In some embodiments, the request may or may not be encrypted. In some embodiments, the encryption of the request may or may not use a unique encryption key. In some embodiments, the encryption of the request may or may not use a pre-established key, which may be a symmetric key or an asymmetric key. Server 15 sends a certificate signed by a trusted authority to fourth software module 1672, module 201, or second software module 72 (step 1605). In some embodiments, the certificate may be encrypted using the unique encryption key. In some embodiments, the encryption of the certificate may use a pre-established key, which may be a symmetric key or an asymmetric key.

Fourth software module 1672, module 201, or second software module 72 verifies that the certificate from server 15 is genuine using a public root CA (Certificate Authority) (step 1607). If the certificate is not genuine, then the registration process is aborted and in some embodiments the incident is reported, logged, or alerted to the user and/or administrator of server 15. If the certificate from server 15 is genuine, then the fourth software module 1672, module 201, or second software module 72 sends its own certificate (e.g., the certificate from the application on mobile phone 41) to server 15 (step 1609). The certificate from fourth software module 1672, module 201, or second software module 72 can be encrypted with the certificate from server 15 before the certificate from fourth software module 1672, module 201, or second software module 72 is sent to server 15. In some embodiments, fourth software module 1672, module 201, or second software module 72 may also send the secure identification code or Secure ID from server 15 (if available) in an encrypted manner with the certificate from the server 15 to server 15.

In some embodiments, fourth software module 1672, module 201, or second software module 72 may also send additional information such as one or more of mobile device information (e.g., from mobile phone 41), an application version, an encryption version, a list of installed applications, and an Operating System version in an encrypted manner using the certificate from the server 15 to server 15. The server 15 sends a confirmation of the registration including a key to fourth software module 1672, module 201, or second software module 72 (the confirmation can be encrypted with the certificate from the fourth software module 1672, module 201, or second software module 72) (step 1611)

In some embodiments, server 15 may also send policies to instruct the fourth software module 1672, module 201, or second software module 72 to change its configuration (which also can be in an encrypted manner using the certificate from fourth software module 1672, module 201, or second software module 72). In some embodiments, the fourth software module 1672, module 201, or second software module 72 confirms that the confirmation from server 15 is received and processed correctly. In some embodiments, the confirmation can be encrypted with the key received from server 15 (step 1613). In some embodiments, all or some of the steps are sent via SMS. In other embodiments, some or all of the steps are via a data channel of the mobile phone network 40. In other embodiments, all or some of the steps are sent via SMS/MMS.

Encryption

A number of embodiments of systems and methods of the present invention use encryption to address the problems associated with existing encryption models and limitations of throughput in mobile voice communications over a mobile phone network. Although some of the standard features of the mobile device, such as the address book, allow for sharing of information between voice calls and the SMS editor on the mobile phone 41, the challenges induced by the differences have resulted in keeping the secure SMS module 201 and the secure voice module (fourth software module 1672, module 201, or second software module 72) as separate applications on the mobile device. For example, the differences between the encryption techniques of the data channel and the control channel has resulted in keeping the secure SMS module 201 and the secure voice module (fourth software module 1672, module 201, or second software module 72) as separate applications on the mobile device. One of the important characteristics of traffic channel is support of Internet Protocol (IP), which is not available or feasible on control channel. Hence, in this invention when discussing characteristics of the traffic channel, one can assume any channel capable of supporting IP. Some channels may be any part of the mobile phone network or the Internet.

Some embodiments and methods of the invention establish a secure voice communication based on a unique encryption key that is established between a first software module of the server and fourth software module 1672, module 201, or second software module 72 of the mobile device. The secure SMS registration process for establishing such a unique encryption key using SMS/MMS, data, or a combination thereof can include using one or more or any combination of AES (Advanced Encryption Standard), Blowfish encryption, ECC (Elliptic Curve Cryptography), RSA encryption, or any other suitable encryption. Furthermore, the invention uses a dynamic codec switcher to accommodate network changes on the mobile phone network for a variety of parameters such as latency, drop rate, and bandwidth on the mobile phone network. Furthermore, the invention allows for in-call switching of codecs (codec hot-swap) and uses a network manager. The network manager can be configured as a part of a fourth software module 1672, module 201, or a second software module 72 (or separate from them) and acts as a module to measure network conditions on both sides (transmit/receive) of a call through the mobile phone network. The network manager can also switch communications from a mobile phone network to the Internet, a WiFi network, or a local network (and vice-versa). Network conditions can include latency, throughput, and bandwidth of the mobile phone network. The data thereby collected by the network manager is used to make informed decisions about choosing a more suitable codec for handling the call on the mobile phone network.

Mobile communication takes place over traffic and control channels of a mobile phone network 40. While the traffic channel is basically used for carrying signals such as voice calls, data, and multimedia, the control channel is used for SMS (short messaging service) amongst other operating signals. Other operating signals can include synchronization signals, paging signals, and access signals. One of the common protocols for transmission of voice communication over Internet Protocol (IP) is Voice over IP (VoIP). VoIP is commonly used for end-to-end encryption of voice communication. VoIP takes place over the traffic channel as it uses data signals for the transmission. Similar to voice calls, one main assumption for VoIP communication is that both sides of the communication are online in real time and available simultaneously for the communication. Contrary to voice calls and VoIP, SMS is a store-and-forward technique, which does not require an end-to-end connection to be available simultaneously. Furthermore, SMS is optimized for transmission of short messages (as compared to longer messages used for voice, multimedia, or other). Traditionally, when securing VoIP communication, the encryption techniques that are used for encrypting VoIP rely on characteristics of the data channel and therefore vary in techniques used for encryption of SMS (which relies on characteristics of the control channel).

Embodiments and methods of the present invention can take advantage of some of the characteristics of the control channel to enhance encryption of VoIP communication. Furthermore, they can take advantage of combining a secure SMS module 201 with a secure voice module 1672, secure audio module, secure video module, secure video streaming module, secure video conferencing module, and secure multimedia module as well as secure IP (Internet Protocol) SMS, which sends SMS over the traffic channel. IPSMS is a way of emulating SMS messages via data. SMS uses a control channel. Data uses a traffic channel. The characteristics of the two channels are somewhat different. It is possible to send short messages on a data channel to emulate SMS but not all characteristic of SMS on a control channel will be available on IPSMS.

A number of embodiments and methods use encryption to address the problems associated with the vulnerability of using SSL/TLS in mobile voice communications. They can use a control channel of a mobile phone network (e.g., for transmitting/receiving SMS/MMS messages), where possible, and can perform a security handshake such as using a secure SMS module 201 or API. The control channel of a mobile phone network can be used with a registration process, which provides additional reliability and a higher level of security for voice communication. Such methodology utilizes a secondary communication method or channel (e.g., using both the control channel and the traffic channel), which is more difficult to exploit by attackers. Furthermore, when SMS/MMS is used, the phone number of the sender (or user) can be verified and a whitelist process can establish the list of mobile devices authorized for registration. Whitelist is defined herein and can also include a process to determine which types of information or data are permitted to be transmitted or received through the mobile phone network. Furthermore, when SMS is used, then the control channel of the mobile phone network is used (which is more resilient and uses less bandwidth). Using whitelisting in the control channel is more secure than using the data channel.

Amongst other things, the registration process (that takes place over the control channel using SMS) authenticates the user of the mobile device (non-repudiation), the mobile device itself, and the server (gateway). Authentication of the mobile device is one of the important characteristics of registration through the control channel that is not available in the traffic channel. An authenticated mobile device acts as what-you-have, which enhances the security of what-you-know. Traditionally what-you-have has been established via security dongle that are provided to each individual user, which is costly compared to the mobile device (which is already owned by the user).

Additionally, via the registration process, a secure communication connection is established between the mobile device and the server and a unique encryption key is established between the mobile device and the server. The unique encryption key can be renewed based on policy decided by the administrator of the system.

Once the registration process is established over the control channel, all other modules operating on the traffic channel can utilize the unique encryption key that has been established for communication (transmission and receipt of information). Other benefits of combining the secure SMS module 201 with other modules is the sharing of one or more secure address books between all modules, having a single sign-on process, having common configuration, sharing of the storage area, enhanced user experience, enhanced overall efficiency of combining secure SMS communication with secure voice communication, and more.

By combining the secure SMS and secure voice modules, the secure SMS module can also benefit from characteristics of the traffic channel including send and receiving information such as IPSMS, policy information, group information over IP. In this invention, secure SMS and secure voice can sync the phones stored in the secure address book with the server and identify the phones in the secure address book that have similar software and are capable of secure communication.

In some embodiments, the unique encryption key of the registration process is used in conjunction with SSL/TLS and the SIP (Session Initiation Protocol) packets are encrypted and decrypted at the server and mobile device. In other embodiments, the unique encryption key or the registration process is used in conjunction with SRTP (Secure Real-time Transport Protocol) and packets are encrypted and decrypted at the server and mobile device.

An SIP packet containing the unique encryption key is encrypted at server 15 before being transferred through a TLS/SSL channel via mobile phone network 40 to mobile phone 41. Secure communication such as by SMS is used to more reliably authenticate mobile phone 41. Utilizing secure communication such as SMS, server 15 is capable of verifying the phone number of mobile phone 41. Furthermore, the secure communication (e.g., SMS message) is encrypted to prevent eavesdropping and further strengthen the security of the communication between server 15 and mobile phone 41. In an alternate embodiment, an MMS message can be used.

Some embodiments and methods of the invention use encryption, a unique encryption key, configuration of mobile devices, and dynamic command delivery by encrypted mobile communications (e.g., SMS/MMS message). This is done to address the problems associated with the vulnerability of using mobile voice communications. As illustrated in FIGS. 7 through 15, an encryption key or keys can be used and configurations and other information can be communicated through an encrypted method. The key or keys can also dynamically be changed through an encrypted method. Commands to perform tasks can additionally be delivered to a mobile device (such as a handset) or an application through an encrypted method.

In the past, mobile applications that primarily have used data for communication relied on pull technology to determine if the server intends to send information to the mobile application. In another words, the mobile application contacts the server periodically to determine if the server has some information than need to be sent to the mobile device. This process is not considered very efficient, as it excessively uses the resources of the mobile device. To this extent, some mobile Operating System manufacturers introduced the concept of push notification, by which the mobile application is notified when it needs to contact the server. On the other hand, mobile applications that utilize an SMS or MMS channel, rely on push technology where the message is pushed from server to the mobile application.

Since push notification is not reliable or for the purpose of redundancy, it is possible to send an SMS or MMS message, either encrypted or plain text, to a mobile application running on the mobile device to instruct the application to contact the server. This technique could be used along with push notification or just by itself. Secure voice mobile applications primarily utilize a data channel and are in constant communication with the server to know if there is a task waiting for them. For example, to learn if there is a phone call waiting for connection to the mobile device. If secure voice communications also utilize SMS or MMS, disclosed herein, the server can send a message to the mobile phone when there is a phone call waiting to connect, and the SMS can wake up the mobile application and instruct it to contact the server. Thus, with some embodiments and methods of the invention, commands to perform tasks can be delivered to handset or application through an encrypted method such as Secure SMS; including but not limited to the ability to stop activity on the data channel and application, or "put it to sleep" to preserve battery and device resources, as well as "wake up" a data connection via SMS, Push Notification, or another method.

Some embodiments and methods of the invention use an encrypted address book scan and encrypted mobile communications (e.g., SMS/MMS message) to address the problems associated with the vulnerability of using mobile voice communications. Depending on the server settings, the user's address book on the user's mobile device can be scanned and the server can find others who have such secure communication software module or application on their mobile devices, if such others users have chosen to be listed. This makes it convenient for the user to setup secure calls with other users using their mobile devices and encrypted mobile voice communications. Users can also share a secure contact list between applications on the mobile device and the server and/or among applications on the mobile device. Users can also share unique login, setup, configuration, and other similar features using mobile voice communications that are secure. All the information between users is transferred in an encrypted way (e.g., voice (talking on the mobile device), text (SMS/MMS messages), data, or any other).

Once the registration process is established over the control channel, all other modules operating on the traffic channel can utilize the unique encryption key that has been established for communication (transmission and receipt of information). Other benefits of combining the secure SMS module 201 with other modules is the sharing of one or more secure address books between all modules, having a single sign-on process, having common configuration, sharing of the storage area, enhanced user experience, enhanced overall efficiency of combining secure SMS communication with secure voice communication, and more.

By combining the secure SMS and secure voice modules, the secure SMS module can also benefit from characteristics of the traffic channel including send and receiving information such as IPSMS, policy information, and group information over IP. Secure SMS and secure voice can sync the phones stored in the secure address book with the server and identify the phones in the secure address book that have similar software and are capable of secure communication.

In some embodiments, the unique encryption key of the registration process is used in conjunction with SSL/TLS and the SIP packet are encrypted and decrypted at the server and mobile device. In other embodiments, the unique encryption key or the registration process is used in conjunction with SRTP (Secure Real-time Transport Protocol) and packets are encrypted and decrypted at the server and mobile device.

An SIP packet containing the unique encryption key can be encrypted at server 15 before being transferred through a TLS/SSL channel via mobile phone network 40 to mobile phone 41. Secure communication such as by SMS is used to more reliably authenticate mobile phone 41. Utilizing secure communication such as SMS, server 15 is capable of verifying the phone number of mobile phone 41. Furthermore, the secure communication (e.g., SMS message) is encrypted to prevent eavesdropping and further strengthen the security of the communication between server 15 and mobile phone 41. In an alternate embodiment, an MMS message can be used.

FIGS. 14 and 15 illustrate one example method of managing mobile voice communications in an encrypted and secure manner according to the present invention. As shown in FIGS. 14 and 15, the server/gateway IS/administer sends/communicates the secure identification code/Secure ID to user (act 1601). Fourth software module 1672 (or 72 or 201) then sends a request to server/gateway IS/administer with interest/request to register with server/gateway IS/administer (act 1603). The server/gateway IS/administer sends a certificate signed by a trusted authority to fourth software module 1672 (or 72 or 201) (act 1605). Fourth software module 1672 (or 72 or 201) then verifies the certificate from server/gateway IS/administer as genuine using a public root CA (Certificate Authority) (act 1607). If the certificate is not genuine, then the registration process is aborted; otherwise, if certificate genuine, then fourth software module 1672 (or 72 or 201) sends its own certificate to server/gateway IS/administer (act 1609). Server/gateway IS/administer sends confirmation of registration with a key to fourth software module 1672 (or 72 or 201) (can encrypt with certificate) (act 1611). Fourth software module 1672 (or 72 or 201) then sends confirmation which can be encrypted with the key received from server/gateway IS/administer (1613).

Secure Messaging Communication

Some embodiments of a system according to the invention are configured for managing (i.e., creating, editing, viewing, compressing, decompressing, disassembling, reassembling, queuing, routing, encrypting, decrypting, sending, receiving, replying, forwarding, storing, and/or the like) communications (for example, short messaging service (SMS) messages, multimedia messaging service (MMS) messages, and other information transmission, and/or the like) in a secure manner (e.g., in an encrypted or otherwise secured manner). In one exemplary embodiment, a secure short messaging service (SMS) system comprises a software module configured for use on a device, such as a mobile device. The software module is configured to encrypt an SMS or MMS message via a first encryption. A gateway is configured to communicate with the mobile device. The gateway is configured to receive the encrypted SMS message from the mobile device.

In yet another embodiment, a method of deleting information on a mobile device, comprises transmitting, to a mobile device, a secure message comprising a wipe instruction. At the mobile device, at least one item of information is deleted responsive to the wipe instruction.

Referring to FIG. 12, a registration process is put in place to authenticate the user, mobile phone 41, and server 15, and to create a secure communication between mobile phone 41 and server 15.

In addition, module 201 may be configured to support methods for determining unauthorized access to module 201 (i.e., intrusion detection, and the like). For example, if the correct password to gain access to module 201 is not provided for three (3) consecutive times (or any desired value chosen by a user or a gateway administrator), data stored by module 201 and/or module 201 itself may be deleted.

Additionally, a module 201 on a mobile device may be registered with multiple gateways 115 simultaneously. For example, a module 201 may be registered with a first gateway 115 associated with a GSM network of a first carrier, and communications between module 201 and the first gateway 115 may be transmitted via a GSM modem. The same module 201 may also be registered with a second gateway 115 associated with a CDMA network of a second carrier, and communications between module 201 and the second gateway 115 may be transmitted via a CDMA modem. Module 201 may be registered with any suitable number of gateways 115 in order to facilitate communications with various intended message recipients. Similarly, a gateway 115 may be configured to communicate with a first group of modules 201 associated with a first carrier via a first GSM modem, configured to communicate with a second group of modules 201 associated with a second carrier via a second GSM modem, configured to communicate with a third group of modules 201 via a dedicated short code, and so on. In this manner, gateway 115 may communicate with multiple modules 201 via a cellular modem and/or other communications device appropriate for each particular module 201 (e.g., based on particular mobile phone hardware, for example).

In certain embodiments, gateway 115 can be configured to allow a message, such as an SMS or IPSMS message, from a module 201 to be delivered only to other modules 201 who are in a common circle of trust with the message sender. Stated another way, in various embodiments, a module 201 may only be permitted to communicate with other members of a predefined group. For example, a module 201 utilized by a sensitive government agency may be permitted to communicate only with other members of the same agency. Moreover, gateway 115 may also be configured to allow an SMS message from a module 201 to be delivered only to other modules 201 who are in a common circle of trust with each other, but not with the message sender. In this manner, gateway 115 may be further secured, as unintended and/or undesired communications outside a particular circle of trust or other group may be reduced and/or eliminated. Further, gateway 115 may be configured to allow an SMS message from a module 201 to be delivered to any other module 201. Moreover, gateway 115 may be configured to contact another gateway 115 for information regarding a module 201 registered with the other gateway 115. Gateway 115 may also be configured to route at least one message of module 201 to another gateway 115.

In various embodiments, gateway 115 may be configured with a "whitelist" comprising a list of approved modules 201 and/or mobile devices which may be authorized to be registered with gateway 115. For example, a user 21 may desire to enroll in mobile banking services offered by third party 31. User 21 communicates the desire to third party 31, who approves the request. The module 201 associated with user 21 may then be added to a whitelist on gateway 115 associated with third party 31. User 21 may then register their module 201 with gateway 115. In this manner, a pre-approved, trusted set of modules 201 may be defined and/or registered such that communications between members of the whitelist and/or one or more third parties may be facilitated. Moreover, each module 201 and/or mobile device in a whitelist may be configured with a unique identification code. The unique verification code may be valid for a limited period of time, for example six hours. In this manner, security may be improved, as a module 201 may be required to both be a member of a whitelist and provide a unique identification code in order to register with gateway 115 and/or to communicate with other modules 201 via gateway 115.

In certain embodiments, third party 32 also provides information to module 61 or module 201 on server 15 through a communication means other than the Internet 10. Such a communication means may be, for example, a private network, a local area network (LAN), a wide area network (WAN), a telephone network, a financial or bank card network, etc. Third parties 31, 32, and 33 are examples of data providers, or personal data providers. Third parties 31 to 33 may be, for example, lottery organizers or operators (e.g., a government agency, a state, or a gambling organization), brokers for lottery organizers (e.g., resellers, convenience stores, or server 15), distributors for lottery organizers (e.g., resellers, convenience stores, or server 15), financial institutions, airlines, bank card providers, merchants, an employer or employee of the user, news providers, health care providers, insurance companies, stock brokers, governmental agencies, non-governmental organizations, etc., or any of these that may be functional on-line.

Module 201, server 15, and/or gateway 115 or other components utilizing encryption may utilize any suitable encryption techniques and/or security models to encrypt, decrypt, compress, decompress, or otherwise manipulate and/or process information, for example symmetric key, asymmetric key, AES, block cipher, and the like. Moreover, module 201, server 15, gateway 115, and/or other components may update, revise, expand, replace or otherwise modify the security model and/or encryption technique utilized, as desired.

Module 201 can be configured to store a set number of messages on server 15, gateway 115, or the user's phone. Module 201 can be configured to store the latest specified number of messages (set by the user, server 15, or gateway 115). Older messages may be deleted to make room for new messages (although permanent means of storage can also be used). Users can mark messages that should be exempt from this deletion process. Such marked messages may be stored until manually deleted by the user, server 15, or gateway 115.

In certain embodiments, users 21, 22, and 23 may communicate with each other through SMS messages or other messages in a secure manner. For example, module 201 or a second software module 72 (described below) on the mobile phone of user 21 may send an SMS message intended for delivery to a mobile phone of user 22. Module 201 is accessed and installed onto the user's mobile phone much like module 61 or module 72 are accessed and installed onto the user's mobile phone. In many embodiments, a text message, large text file, or other information desired to be transmitted may need to be in a particular format in order to be able to transmit it using one or more SMS messages (e.g., due to the limitation of the number of characters that can be transmitted in an SMS message). In one example, numerous text messages are sent from server 15 (or phone 41 of user 21) to phone 42 of user 22, the text messages are compiled at phone 42 of user 22, and user 22 reviews one large text file (or text message) on phone 42. In this example, the transmission of one text message or multiple text messages is seamless to user 22 (e.g., user 22 receives one large text file or text message (instead of multiple text messages)). This format can be useful in sending information using text messages without the limitation of the number of characters typically found in text messaging. Stated another way, when the size of a particular piece of desired information exceeds a message size threshold, multiple messages may be utilized to convey such desired information to and/or from a mobile device.

With reference now to FIGS. 9-11 and in various embodiments, communications between one or more users 21/22/23 and/or third parties 31/32/33 can be routed through a trusted gateway 115. In this manner, system security may be improved. Gateway 115 communicates with one or more third parties 31/32/33 and/or users 21/22/23 (for example, via mobile phones 41/42/43) to send, receive, and store short messaging service (SMS) messages and multimedia messaging service (MMS) messages in a secure manner. Gateway 115 may also communicate with users 21/22/23 in a conventional (unsecured) manner, if desired. Moreover, users 21/22/23 and/or phones 41/42/43 may download software (e.g., secure SMS module 201) from a server 15. Gateway 115 may be notified of such installation and be configured to communicate with module 201 accordingly.

In an embodiment, gateway 115 may be configured as Software as a Service (SaaS). Gateway 115 may be accessed by third parties authorized to utilize the SaaS via a secure network connection, such as HTTPS. Performance of gateway 115 may be scaled, for example through use of load-balanced server farms. Moreover, gateway 115 may be connected to wireless carrier networks via multiple redundant connections. In this manner, gateway 115 may be configured to support a scalable number of users.

In another embodiment, gateway 115 may be configured as an on-site enterprise server. Gateway 115 may thus be accessed by an organization's internal resources, for example via a dedicated short code hosted with any supported aggregator or carrier. Moreover, gateway 115 may be configured to support a limited-access "circle of trust" allowing communication only between certain authorized users. Gateway 115 may also be configured with a customizable encryption scheme, message storage and/or archiving functionality and other features as desired by a particular organization deploying gateway 115 on-site.

In another embodiment, gateway 115 may be configured as a wireless carrier managed service. Gateway 115 may thus be partially or fully integrated into a wireless carrier's gateway, for example a wireless carrier's short messaging service center (SMSC). Alternatively, gateway 115 may operate as a stand-alone system. For example, gateway 115 may communicate with a SMSC of a first wireless carrier and with a SMSC of a second wireless carrier. Moreover, a gateway 115 may be associated with and/or coupled to any number of SMSCs. Similarly, one SMSC may associated with and/or coupled to any number of gateways 115. In this manner, gateway 115 may be configured to support a scalable number of users in a wireless carrier environment, and gateway 115 may facilitate secure delivery of messages across various networks.

With reference now to FIG. 12 and in various embodiments, one or more of third parties 31, 32, and 33 can create an account associated with gateway 115 (step 602). Third parties 31, 32, and 33 notify users 21, 22, and 23 to download module 201 onto phones 41, 42, and 43 (step 604). Alternately, third parties 31, 32, and 33 can send module 201 to users 21, 22, and 23 through a MMS (Multimedia Messaging Service) or WAP (Wireless Application Protocol) push (step 606). The user downloads the module 201 (step 608). One or more APIs (Application Programming Interfaces) and https (Hypertext Transfer Protocol over Secure Socket Layer) or http (Hypertext Transfer Protocol) can be used between server 15 or gateway 115 and third parties 31, 32, and 33 or users 21, 22, and 23. Moreover, server 15, gateway 115, third parties 31, 32, and 33, and/or users 21, 22, and 23 may communicate via any suitable protocol, method, or means. Accordingly, the methods of the present disclosure are suitable for use on Global System for Mobile Communications (GSM) networks, code division multiple access (CDMA) networks, time division multiple access (TDMA) networks, frequency division multiple access (FDMA) networks, transmission control protocol/internet protocol (TCP/IP) networks, satellite communications networks, and/or the like, and/or any combination of the same.

A secure SMS API is used by third parties 31-33 to send a SMS or MIMS message to gateway 115 or server 15 (step 610). A secure SMS API may utilize HTTPS, Web Services, Java API, and/or any other suitable protocols. A determination is made as to whether the user has module 201 loaded on their phone 41, 42, or 43 (step 612). If the user has module 201 loaded on its phone, then the user receives a secure SMS or MMS message on their phone in module 201 (step 614). An acknowledgement message may be sent back to the sender of the message (e.g., user 21, 22, or 23 or third party 31, 32, or 33) (step 616). Once the receiving user opens the message it received (step 618), another acknowledgement message may be sent to the sender via server 15 or gateway 115 confirming that the user opened the message (step 620). If the user does not have module 201 loaded on their phone, then the user may receive a link to download module 201 onto their phone (step 622), the message may be sent in clear text, the message may be skipped, an anonymous message retrieval method (as discussed above) may be utilized, and/or the like.

In various embodiments, with continued reference to FIG. 12, a user downloads module 201 (step 624). When the user elects to send a message from its phone to the phone of another user or third party (step 626), the user enters one or more phone numbers to send a message to in its phone (alternatively, the user may select from a secure address book on the user's phone) (step 628). For example, using a secure address book, the user can import their general address book content (from their phone) into their secure SMS address book (e.g., located in a database created by module 201). The information in the secure SMS address book is encrypted and stored on the phone. In this manner, if the phone is lost or stolen, those with access to the phone may be prevented from extracting personal contact information (or other sensitive information) from the phone.

The user's message is encrypted and sent to gateway 115 (step 630). As previously discussed, a determination is made as to whether the receiving user has module 201 loaded on its phone (step 612). If the user has module 201 loaded on its phone, then the user receives a secure SMS or MMS message on their phone in module 201 (step 614). An acknowledgement (for example, a delivery confirmation) is sent back to the sender of the message (step 616). Once the receiving user opens the message it received (step 618), then another acknowledgement (for example, a read confirmation) is sent to the sender via server 15 or gateway 115 confirming that the user opened the message (step 620). In certain embodiments, when a user replies to or forwards a message, a message identification is included in the message to enable tracking of which message was replied to, forwarded, and the like. In some embodiments, additional information may be embedded into the message, for example a total number of messages, a number representing the sub-message in the message chain, and the like. In this manner, a "thread" of related messages may be managed.

In various embodiments, the sender could log into a website associated with server 15 or gateway 115 to determine if the message has been delivered and opened. In another example, when the receiving user opens the message, module 201 automatically deletes the message within a predetermined period of time after the message is opened. In another example, when the receiving user opens and closes the message, module 201 automatically deletes the message (either immediately or within a predetermined period of time after the message is closed). Server 15, gateway 115, or module 201 can create such an automatic deletion process by including a field in the header of the message (or in the body of the message) with a command to delete the message upon one of the exemplary events (or other defined event, time period, and the like). Users and third parties can view the status of every message. For sent messages, users and third parties can tell when each message was sent, when each message was delivered, and when each message was opened (e.g., via time, date, and status information about the message). For example, one or more icons may be provided (e.g. within module 201, via a web browser, and the like) in order to indicate the status of a particular message (e.g., sent, delivered, read, replied to, forwarded, deleted, and the like).

In some embodiments, third parties 31, 32, and 33, and/or users 21, 22, and 23 can elect to wipe their phone (e.g., delete one or more items of information or data) remotely. For example, if a phone is lost, misplaced, or no longer being used, wiping the phone of any personal information, messages, or other information may be desired. Third parties 31, 32, or 33, and/or users 21, 22, or 23 can utilize a secure SMS API or other method to send a wipe command to one or more phones. In one example, the user can access the third party's website or server 15 in order to send a wipe command to the user's phone. Gateway 115 authenticates the user, encrypts a wipe command, and sends the encrypted wipe command to the user's phone via a SMS or MMS message, or via other suitable method (e.g., within the body of a message, in the header of a message, and the like). Module 201 on the user's phone receives the encrypted wipe command and decrypts the encrypted wipe command. A secure SMS database (created by module 201) on the user's phone is deleted based on the decrypted wipe command. Moreover, a wipe command may also result in deletion of data other than or in addition to a secure SMS database. For example, via a wipe command, the memory contents of a phone or data for other applications may be at least partially and/or entirely wiped, deleted, reset, and the like. Additionally, module 201 can be configured to automatically wipe a secure SMS database and/or an entire phone memory responsive to repeated failed local authorization attempts or other reasons as desired. In this manner, security of data located on a phone may be enhanced.

Moreover, in various embodiments, one or more components of system 100 may be configured to log, record, or otherwise monitor communications between a phone and a server, for example, to detect attempts to "spoof" or otherwise impersonate a phone or other telecommunications device, or otherwise misrepresent the origination or other attributes of one or more messages. System 100 may also inform a user, a system administrator, a third party, and the like, of the contents of such records, for example, attempts to spoof a user's identity or to send messages purporting to come from a particular user or a particular mobile device.

Turning now to FIG. 13, in some embodiments, a user sends a message from one phone to another (e.g., from phone 41, 42, or 43 to phone 41, 42, or 43) in a secure manner (step 802). Prior to sending the message, the message is encrypted on the first phone (e.g., using a first encryption key) (step 804). The encrypted message is sent to gateway 115 (or server 15) (step 806) and gateway 115 (or server 15) receives the encrypted message (step 808). The encrypted message is decrypted at gateway 115 (or server 15) (e.g., using the first encryption key) (step 810). A determination is made as to whether the message is from one phone to another of a user (step 812). If the message is not from one phone to another of a user (e.g., from a user phone to a third party), then the message is sent to the third parties server, for example using Web Services, Java remote method invocation (RMI), HTTP/S Post, and the like (step 814). A delivery confirmation may then be sent to the phone. If the message is from one phone to another of a user, then the message is encrypted (e.g., using a second encryption key) at gateway 115 (or server 15) for the recipient user (step 816). The encrypted message is sent to the receiving user's phone (step 818). The receiving user's phone receives the encrypted message. (step 820). A delivery confirmation is sent to gateway 115 (or server 15) that the message was delivered to the receiving user's phone (step 822). The encrypted message is decrypted (e.g., using the second encryption key) at the receiving user's phone and opened. A delivery confirmation may be displayed on the sender's phone by changing the icon associated with the sent message, or may be shown on a status page. Once the receiving user opens the decrypted message, an open acknowledgement or other suitable read confirmation is sent to gateway 115 (or server 15) (step 824). Gateway 115 or server 15 may forward the open acknowledgement to the sender's phone. The open acknowledgement may be displayed on the sender's phone by changing the icon associated with the sent message, may be shown on a status page, and/or the like.

In various embodiments, the original message sent is encrypted differently than the message finally received, so that only users or third parties who have the relevant encrypted key can decrypt, open, and read the message. Each user or third party can have their own unique key, so that one user or third party cannot access, open, or read another user or third party's message. Each unique key can also be changed as desired, for example periodically, for additional security. Moreover, a user may modify its own encryption key manually or at a specific time interval. This key change made by the user is communicated to gateway 115 to keep module 201 in synchronization with gateway 115. Moreover, the encryption key associated with a particular mobile device may be stored off the mobile device for additional security.

In certain embodiments, an encryption key associated with a particular module 201 may be updated. Gateway 115 is configured with two encryption keys per module 201, a current key and a new key. Module 201 is configured to use the current key. Responsive to a predetermined interval, a key change request from module 201, and/or a key change instruction from gateway 115, module 201 is configured to replace the current key with the new key. The current key is kept active on gateway 115, and a new key is generated. A key change command, including the new key, is sent to module 201. The status of module 201 is changed to from "current" to "pending". Messages to and from module 201 are held in a queue on gateway 115 until the status of module 201 returns to "current".

When the key change command is received by module 201, module 201 stores the new key in place of the current key, and transmits a key change acknowledgement to gateway 115 using the new key. When gateway 115 receives the key change acknowledgement from module 201, the new key is copied to the current key, and the new key is set to a blank value. The status of module 201 is changed to "current". Messages in the queue for module 201 may then be processed utilizing the current key (which was formerly the new key), and messages sent and/or received using the old key (formerly the current key) will fail and may be logged.

In the event module 201 does not return a key change acknowledgement after a key change command is sent to module 201, gateway 115 may re-send the key change command to module 201 one or more times. If a key change acknowledgement is not received from module 201, for example within a predetermined time period, in response to a predetermined number of transmitted key change commands, and the like, the status of module 201 may be changed to "suspended". Moreover, gateway 115 may be configured to periodically check all pending key change requests, resend key change commands, and/or disable one or more modules 201, as appropriate.

If module 201 is suspended responsive to an uncompleted key change, or disabled by an administrator associated with gateway 115, module 201 may be required to re-register with gateway 115. Upon re-registration with gateway 115, the status of module 201 may be set to "current" and queued messages for module 201 may be processed.

In various embodiments, one or more messages may be queued and/or otherwise stored on gateway 115. Messages queued on gateway 115 may be encrypted via a third encryption key, for example a storage encryption key associated with gateway 115. Queued messages may be marked for automatic or manual processing. Messages marked for automatic processing may be processed when the associated module 201 returns to "current" status. Messages marked for manual processing may be processed via a system administrator or other manual process. Messages may be kept in a queue for a predetermined period of time, for example three days. Messages which have been in a queue longer than a predetermined period of time may be archived.

As discussed above, in various embodiments, module 201 may have a status associated therewith, for example "pending", "whitelisted", "current", "suspended", "disabled", and the like. A whitelisted module 201 has been placed on a whitelist but has not registered with gateway 115. A current module 201 has registered with gateway 115 and its encryption key is up-to-date. A pending module 201 has registered with gateway 115 and a key change command has been sent to module 201, but a key change acknowledgement has not yet been received from module 201. A suspended module 201 has registered with gateway 115 and a key change command has been sent to module 201, but a key change acknowledgement has not been received from module 201 within an allowed time, within a predetermined number of requests, and the like. A disabled module 201 was once registered with gateway 115, but has been disabled by an administrator or other supervisory entity associated with gateway 115, for example in response to an unpaid bill, a report of a lost mobile device, repeated entry of an incorrect password, and the like.

When module 201 is pending, messages may be queued. When module 201 is whitelisted, messages may be queued. When module 201 is current, messages may be processed. When module 201 is suspended, messages may be queued. When module 201 is disabled, messages may be flagged as invalid and/or deleted. Moreover, module 201 may be associated with any appropriate status, and messages associated with module 201 may be queued, processed, deleted, and the like, in any suitable manner to enable secure communications between module 201 and gateway 115.

A message sender can run reports to determine which messages have been received and/or read/opened. Moreover, server 15 and/or gateway 115 may be configured to store various information related to a user, for example a "mirror" or duplicate copy of one or more items of information stored on a users phone (e.g. personal information, credit card information, identification information, financial information, health records, and the like), records of user messages sent and received, and the like. Because server 15 and/or gateway 115 may track, monitor, and/or store each message in and out of server 15 and gateway 115 (and whether the message was delivered and opened, and the like), such tracking of information can be used for compliancy reports (e.g., under the Sarbanes-Oxley Act or Federal Information Security Management Act), audit trail evidence, internal company control of information within company (e.g., through information technology) or in and out of company, fraud risk assessment and detection, or any other desired use. Since gateway 115 tracks delivery of every message, gateway 115 can be configured to resubmit a message that has not been delivered (e.g., due to error or any other reason). Gateway 115 can be configured to set the duration between resubmission of a message to a predetermined period of time or based on the status of the message (e.g., received, opened, and the like).

Referring now to FIGS. 7 and 8, in a particular embodiment provided as an example, system 202 manages personal information and/or enables secure communication for any number of users, and includes a SECURE MOBILE INFORMATION MANAGEMENT™ (SMIM) platform 200 and Personal Data Providers 209. SMIM platform 200 is an example of a technology platform for system 100 which enables mobile phone users (e.g., 21 to 23) to have access to certain personal information via their mobile phone (e.g., 41 to 43), in some embodiments, even when there is no signal or internet connection for the cell phone (e.g., from mobile telephone network 40). In this embodiment, SMIM platform 200 includes one or more blocks of code configured to provide the framework and foundation of system 100 and encompasses functionality from defining standards under which development takes place to defining security, to communication between components and various core software applications.

In certain embodiments, SMIM platform 200 includes module 201 (e.g., MICRO AGENT™ module or MICRO AGENT TECHNOLOGY™ (MAT) module) and module 203 (e.g., WEB SERVICES module or CELLTRUST WALLET WEB SERVICES™ module). In this example of an embodiment, module 201 runs on mobile phones, and is an example of the second software module 72, or a portion thereof, and module 203 is an example of first software module 61, or a portion thereof. In this example, module 203 is a block of code or software that runs on server 15 and that communicates with or exchanges data with module 201 on the phones, website 65, and secure storage 64, for example. Module 203 may be a communication layer between module 201, website 65, and storage 64, for instance. Module 203 may provide or allow authentication, communication, protocol definition, auditing of the integrity of data, prevention of unauthorized access, and so on, and may allow access to website 65 from the Internet 10. Module 201 allows users 21, 22, and 23 to create, send, receive, and store secure SMS and MMS messages via phones 41, 42, and 43.

Module 203 also, in various embodiments, allows third parties (e.g., 31 to 33) or Personal Data Providers 209 (e.g., banks, airlines, merchants, health care providers, and the like) to communicate with a customer (for example, to update their customer's accounts or personal information on storage 64, website 65, and/or secure areas thereof, to exchange electronic medical records in a HIPAA-compliant manner, to provide flight information and/or booking, and so forth). Module 201 or second software module 72 provides a user interface, local storage, synchronization, and alerts components, in this embodiment on one or more of phones 41 to 43. Further, in certain embodiments, a user interface, within mobile phone 41 or second software module 72, may gather information from the user (e.g., 21) and provide information back to the user. For example, Personal Data Providers 209 include financial institutions, airlines, retailers, or merchants. Module 203 allows Personal Data Providers 209 to update customer accounts or personal information such as bank account information and statements, flight information, credit card information and charges.

In some embodiments, local storage (e.g., folder 76 on mobile phone 41) enables the application (e.g., second software module 72) to store information (e.g., nuggets 78 and 79 of information) on the phone (e.g., 41), which may provide for faster access, reduce dependence on the network (e.g., mobile phone network 40, the Internet 10, or both), and may reduce the total cost of ownership by limiting the amount of data communication through mobile phone network 40 that takes place (e.g., at the expense of user 21). In some embodiments, the data (e.g., nuggets 78 and 79) on the phone (e.g., 41) is synchronized with data on server 15 to ensure that the user (e.g., 21) has access to updated information both on their phone (e.g., 41) and on the web (i.e., Internet 10, which may be accessed, at least by user 23, through computer 13, for instance).

In certain embodiments, data is compressed, encrypted, or both, for communication with the mobile phone or device (e.g., between module 201 and module 203 or between the first software module 61 and the second software module 72). In addition, in some embodiments, alerts may provide substantially real time notification of various events or activities that can be sent to a phone (e.g., 41) running module 201 (an example of module 72, or a portion thereof). For example, alerts may inform the user of an important or critical event such as a large withdrawal from their account or a flight cancellation, flight changes, gate changes, or the like. In addition, in some embodiments, module 207 provides a middle tier between users (e.g., 23) operating on their computers (e.g., 13) and module 205, module 201, or both. In some embodiments, module 203 may provide information (e.g., from Personal Data Providers 209) to module 207, which may then be provided to module 205, module 201 (e.g., on the mobile phones), or both.

As used herein, "passive" or "passively" means to not be powered by the battery or electrical system of the phone or electrically connected to the phone (or another battery or electrical system). Further, as used herein, in this context, the "component" of the phone excludes disposable packaging for the phone (that may contain a bar code for product sales or tracking purposes, for example). Further, in some embodiments, the component is comprises a back of the mobile phone, a battery cover of the mobile phone, a battery for the mobile phone or a case for the mobile phone, as examples.

With further reference to FIG. 7, website 65 may include a main or home page (or more than one such page) to which new users and new third parties may be directed. New users may be directed to this page or pages or to website 65 by search engines, advertisers, brokers, agents, or the like, as examples. Users (e.g., 21 to 23) may be assigned (or asked to elect) user names, user ID's, passwords, and/or the like, which they may use to access secure areas or pages of website 65, for example, where their personal information may be entered, displayed, updated, and/or the like. In some embodiments, security of such areas may be provided, for example, using novel systems and methods which may be described herein, for instance. In some embodiments, these secure areas may include information entered by third parties (e.g., 31, 32, and 33). Further, in some embodiments, third parties (e.g., 31 to 33) may have their own secure areas (e.g., that are password protected, or protected as described herein), for example, within website 65 or on server 15 or another server, in which the third parties (e.g., some or all of 31, 32, and 33) may be able to enter, view, update, or a combination thereof, information for a number of users.

In some embodiments, the first software module 61 filters the personal information and selects nuggets of the personal information which the first software module 61 sends to the mobile phone (e.g., 41) of the appropriate user (e.g., 21). As used herein, a "nugget of information" is a discrete piece of information that is a subset of the total information. Nuggets of information may be in digital form, for example, and may be in text form, in the form of numbers or values, or a combination thereof, as examples. In some embodiments, nuggets may include pictures, text, graphics, or the like, as further examples. These nuggets may be sent, for example, through mobile phone network 40, for instance, and may be sent as text, MMS messages, or SMS messages, for instance. In some embodiments, server 15 may access mobile phone network 40 through the Internet 10, for example.

In various embodiments, a second software module 72, is operating (e.g., independently) on more than one of the mobile phones (e.g., 41 to 43, although module 72 is shown only on phone 41). Further, in this embodiment, the second software module 72 is configured to receive the nuggets of the personal information of the user (e.g., 21) from the first software module 61 through the Internet 10 and through mobile phone network 40, and to store the personal information on mobile phone 41 so that the personal information may later be accessed by user 21, for example, even when mobile phone 41 is not connected to mobile phone network 40. User 21 may access the personal information, for instance, by viewing folder 76 containing nuggets 78 and 79, which may be organized by subject matter, for example. One such subject may be financial information, for example, which may include account balances, transaction records, and the like, and another such subject, in some embodiments, may be travel information, as another example, which may include, for example, flight departure times and locations, and the like. Other examples of subjects are described herein, and include insurance information, bank card information, medical records, appointments, and the like.

In some such embodiments, for multiple users (e.g., 21 to 23), second software module 72 is downloadable by the users from first software module 61 to the mobile phones (e.g., 41 to 43), for example, through website 65, through the Internet 10, through mobile phone network 40, or a combination thereof. Further, in some embodiments, for many of the users (e.g., 21 to 23), first software module 61 includes instructions to search some or all of the e-mails received for or to the users (e.g., 21 to 23) for keywords, identifying numbers, or both, and to select the nuggets (e.g., 78 and 79) of the personal information from the e-mails using the keywords, identifying numbers, or both. For example, software module 61 may search e-mails received for a specific user (e.g., 21, 22, or 23) for account numbers, flight numbers, names of third parties (e.g., one or more of 31, 32, and 33), etc., and may extract nuggets of information pertaining thereto. In some embodiments, software module 61 may search all e-mails (e.g., sent to particular users), while in other embodiments, only e-mails from certain sources, or certain e-mail addresses may be searched.

In addition, in some such embodiments, for many or all of the users, second software module 72 contains instructions to allow the user (e.g., 21) to select at least a portion of the personal information that is stored on the mobile phone (e.g., select nugget 78), select or enter an identifier of at least one of a different party (e.g., 22) and a different party mobile phone (e.g., 42), and elect to send the personal information (e.g., nugget 78) to the different party mobile phone (e.g., 42). Examples of such a different party are other users, for instance, for user 21, users 22 and 23 may be different parties, and their phones 42 and 43 may be different party mobile phones. Examples of such an identifier include the name of the different party, the phone number for the different party, a user identification number, etc. In many embodiments, for multiple users, the first software module 61 further contains instructions to evaluate whether the different party mobile phone has certain functionality or contains a copy of particular software, such as second software module 72.

In some such embodiments, if the different party mobile phone contains a copy of the second software module 72, for example, then the first software module 61 may send the (at least a) portion of the personal information to the copy of the second software module 72 on the different party mobile phone, for instance, through mobile phone network 40, the Internet 10, or both. On the other hand, in some embodiments, if the different party mobile phone does not contain a copy of the second software module 72, for example, or in some cases other software having adequate equivalent functionality, then the first software module 61 may send the (at least a) portion of the personal information to the different party mobile phone, in another form, for instance, in the form of a standard e-mail or text message.

In addition, in some embodiments, for many or all of the users, first software module 61 contains instructions to receive a command from the user (e.g., one of users 21 to 23), for instance, through mobile phone network 40, to dispute a financial transaction for a particular account described in the nuggets of the personal information. In particular embodiments, for example, upon the receipt of the command, first software module 61 may contain instructions to transmit a dispute of the transaction to a manager of the particular account through a network, such as Internet 10, for example. The manager of the account may be third party 33, for example, and may be a bank or financial institution, for instance. Such a dispute of the transaction may be transmitted to the third party (e.g., 33) in the form of an e-mail or a text message, for example, sent via the Internet 10, mobile phone network 40, or both, while in other embodiments, a dispute of a transaction may be sent through a private or financial network, as another example.

In various embodiments, software module 72, software module 61, and/or various other components may be configured to support a particular application and/or user group, for example mobile banking, entry of health care information, domain registration, airline check-in, intra- and intergovernment agency communication, enterprise communication, and the like.

Further, in some embodiments, some or all of the mobile phones (e.g., 41 to 43) may be configured to transmit, receive, or both, local signals. For example, mobile phone 42 includes local transmitter, receiver, antenna, or a combination thereof, local communication device 82, which, in this embodiment, communicates with reader or local communication device 88. In different embodiments, device 88 may read signals, send signals, or both. Communications devices 82 and 88 may exchange signals in one or both directions through near-field communications, a personal area network, Bluetooth, bar codes, WiFi, or the like, as examples.

Various embodiments also include second software module 77 for running (e.g., that is running) on the user's mobile phone (e.g., the appropriate one of phones 41 to 43). Second software module 77 may include programming instructions to store (e.g., in folder 76) the particular information on the user's mobile phone (e.g., the appropriate one of phones 41 to 43), and provide access to the particular information by the user (e.g., one of users 21 to 23). Such a second software module 77 may be recorded on a computer readable medium, for instance, such as a hard drive, random access memory (RAM) read only memory (ROM), a disk, a memory stick, or the like, as examples.

In some embodiments, second software module 77 may be stored or recorded on a server (e.g., server 15), for downloading onto the user's mobile phone (e.g., the appropriate one or more of phones 41 to 43). In a number of embodiments, second software module 77 may be recorded on memory within the user's mobile phone (e.g., the appropriate one of phones 41 to 43), for example. Such a second software module 77 may be, for example, part of software module 72 shown in FIG. 7 on mobile phone 41. The particular information may be, include, or be included within, for example, the nuggets 78, 79, or both, for instance, as described herein.

Further, in some embodiments, first software module 67 or 61 includes programming instructions to encrypt the particular information before sending the particular information to the user's mobile phone (e.g., 41). In some embodiments, second software module 77 or 72 includes programming instructions to decrypt the particular information. Even further, in some embodiments, first software module 67 or 61 includes programming instructions to compress the particular information before sending the particular information to the user's mobile phone (e.g., 41). And in some embodiments, second software module 77 or 72 includes programming instructions to decompress the particular information. Decryption and compression may be used together or separately in different embodiments.

In some embodiments, for example, for one or more of multiple users (e.g., users 21 to 23), the particular information includes financial account information, which may include, for instance, amounts of withdrawals or debits from an account, such as a financial or bank account. In certain embodiments, the (e.g., at least one) threshold may be, or include, the amount of a withdrawal or debit, for example, and first software module 67 or second software module 77 (or both) may include programming instructions to provide an alarm to the user [e.g., the appropriate one (or more) of users 21 to 23] if a withdrawal or a debit (or both) exceeds the threshold. In another example, in some embodiments, for each of a number of the users (e.g., users 21 to 23), the particular information includes travel information, which includes a departure time, a departure location (e.g., a departure gate), or both. In some such embodiments, first software module 67 or second software module 77 (or both) includes programming instructions to provide an alarm if there is a change in the departure time or the departure location (or both), as examples. In other embodiments, alarms may be provided for other thresholds or other criteria.

In the embodiment illustrated, method 400 also includes monitoring the location of a first mobile phone (act 424), which may be possessed by a particular individual, for example. Such monitoring may be, for example, continuous, at regular intervals of time, during certain times of the day, or the like, which may be selectable by the user in some embodiments. In some embodiments, the frequency of monitoring may be increased if the particular individual is near a region of concern. In the embodiment illustrated, method 400 also includes evaluating whether the first phone is near or within a region (act 428), for example, of concern, and providing an alarm (act 432), for example, through a second mobile phone, when the first mobile phone passes into a region of concern, or within a predetermined distance of a region of concern. Such a predetermined distance may be, for example, 25 feet, 50 feet, 75 feet, 100 feet, 200 feet, 300 feet, 500 feet, or the like, and may be user selectable, in some embodiments. In addition, or instead of alarming at the second phone, in some embodiments, an alarm may be provided (e.g., in act 432) at the first mobile phone, which may be the same or a different alarm, in different embodiments.

In other embodiments, regions of concern may be for other threats, such as traffic hazards, pollution or toxic waste sites, areas of high radioactivity, industrial areas, neighborhoods with high crime rates, gang-controlled areas, quarantine areas, areas with insect infestations, high-drug use or dealing areas, bars, adult establishments, houses of prostitution, gambling establishments, construction areas, areas of severe weather, areas of fighting in theater of war, forbidden areas, foreign territory, private land, areas below high tide, areas where rip-tides occur, areas of shallow water, coastlines, or other maritime navigational hazards, etc. Besides protecting children, embodiments may notify (e.g., in act 432), protect, or both, individuals with substance abuse, alcohol, or gambling problems, police officers, fire fighters, probation officers, parole officers, census workers, soldiers, delivery personnel, salesmen, missionaries, sailors, etc. In some embodiments, the alarm (e.g., provided in act 432) may be provided to the first phone, in addition to, or instead of the second phone.

Referring now to FIGS. 7 and 10, in a particular embodiment provided as an example, SECURE INFORMATION MANAGEMENT (SMIM) includes a platform for system 100 which enables mobile phone users (e.g., 21 to 23) to have access to certain personal information via their mobile phone (e.g., 41 to 43), even when there is no signal or internet connection for the cell phone (e.g., from mobile telephone network 40). In this embodiment, SMIM includes one or more blocks of code that provide the framework and foundation of system 100 and encompasses functionality from defining standards under which development takes place to defining security, to communication between components and various core software applications.

In certain embodiments, SMIM includes MICRO AGENT and WEB SERVICES. In this example of an embodiment, MICRO AGENT runs on mobile phones, and is an example of the second software module 72, or a portion thereof, and WEB SERVICES is an example of first software module 61, or a portion thereof. In this example, WEB SERVICES is a block of code or software that runs on server 15 and that communicates with or exchanges data with MICRO AGENT on the phones, website 65, and secure storage 64, for example. WEB SERVICES may be a communication layer between MICRO AGENT, website 65, and storage 64, for instance. WEB SERVICES may provide or allow authentication, communication, protocol definition, auditing of the integrity of data, prevention of unauthorized access, and so on, and may allow access to website 65 from the Internet 10.

Still another embodiment implements a method of eliminating a need to carry a card. This example of a method includes replacing an old component of a mobile phone with a new component. In some embodiments, the new component includes at least one of a back, a battery cover, a battery, and a case for the mobile phone, as examples. In some embodiments, the new component includes a magnetic code area configured to produce a magnetic code to be read by a card reader (e.g., device 88) when the phone is passed in close proximity to the card reader. Other embodiments can use a bar code, as another example.

Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for practice unless expressly described as "essential" or "critical". Moreover, those skilled in the art will recognize that changes and modifications may be made to the exemplary embodiments without departing from the scope of the present invention. Thus, different embodiments may include different combinations, arrangements and/or orders of elements or processing steps described herein, or as shown in the drawing figures. For example, the various components, elements or process steps may be configured in alternate ways depending upon the particular application or in consideration of cost. These and other changes or modifications are intended to be included within the scope of the present invention, as set forth in the following claims.

What is claimed:

1. A method for tracking electronic communications for compliance with regulations, the method comprising:

associating a virtual number with a mobile app residing on a mobile device; and at a computer server, receiving a communication intended for a recipient and originating from the mobile app residing on the mobile device;

wherein the server is configured to use at least one of an email and an API to send the communication to a system capable of storing the communication and making the communication available for reporting for compliance with regulations; and wherein the server is configured to use the virtual number associated with the mobile app as the originator of the communication for transmitting the communication to the recipient.

2. The method of claim 1 wherein the system capable of storing the communication and making the communication available for reporting comprises an Enterprise Information Archiving system.

3. The method of claim 1 wherein the server is configured to use an email to send the communication to the system capable of storing the communication and making the communication available for reporting, and wherein the communication is included in at least one of a body of the email and an attachment to the email.

4. The method of claim 1 wherein the communication comprises at least one of an SMS communication, an MMS communication, and a voice call communication.

5. The method of claim 1 wherein the computer server includes at least one of an SMS gateway, an email server, an email gateway, a communication server, and a Private Branch Exchange system.

6. A method for tracking electronic communications for compliance with regulations, the method comprising:
at a computer server, receiving an electronic communication originated from a sender and sent to a virtual phone number, wherein the virtual phone number is associated with a mobile app residing on a mobile device; and
with the computer server, sending the electronic communication to the mobile app residing on the mobile device and showing the sender as the originator of the communication; and
wherein the computer server is configured to use at least one of an email and an API to send the communication to a system capable of storing the communication and making the communication available for reporting for compliance with regulations.

7. The method of claim 6 wherein the system capable of storing the communication and making the communication available for reporting comprises an Enterprise Information Archiving system.

8. The method of claim 6 wherein the server is configured to use an email to send the communication to the system capable of storing the communication and making the communication available for reporting, and wherein the communication is included in at least one of a body of the email and an attachment to the email.

9. The method of claim 6 wherein the communication comprises at least one of an SMS communication, an MMS communication, and a voice call communication.

10. The method of claim 6 wherein the computer server includes at least one of an SMS gateway, an email server, an email gateway, a communication server, and a Private Branch Exchange system.

11. A system for tracking electronic communications for compliance with regulations, the system comprising:
a computer server configured to receive a communication intended for a recipient and originating from a mobile app residing on a mobile device, wherein the mobile app is associated with a virtual number;
wherein the server is configured to use at least one of an email and an API to send the communication to a system capable of storing the communication and making the communication available for reporting for compliance with regulations; and
wherein the server is configured to use the virtual number associated with the mobile app as the originator of the communication for transmitting the communication to the recipient.

12. The system of claim 11 wherein the system capable of storing the communication and making the communication available for reporting comprises an Enterprise Information Archiving system.

13. The system of claim 11 wherein the server is configured to use an email to send the communication to the system capable of storing the communication and making the communication available for reporting, and wherein the communication is included in at least one of a body of the email and an attachment to the email.

14. The system of claim 11 wherein the communication comprises at least one of an SMS communication, an MMS communication, and a voice call communication.

15. The system of claim 11 wherein the computer server includes at least one of an SMS gateway, an email server, an email gateway, a communication server, and a Private Branch Exchange system.

16. A system for tracking electronic communications for compliance with regulations, the system comprising:
a computer server configured to receive an electronic communication originated from a sender and sent to a virtual phone number, wherein the virtual phone number is associated with a mobile app residing on a mobile device;
wherein the computer server is configured to send the electronic communication to the mobile app residing on the mobile device and to show the sender as the originator of the communication; and
wherein the computer server is configured to use at least one of an email and an API to send the communication to a system capable of storing the communication and making the communication available for reporting for compliance with regulations.

17. The system of claim 16 wherein the system capable of storing the communication and making the communication available for reporting comprises an Enterprise Information Archiving system.

18. The system of claim 16 wherein the server is configured to use an email to send the communication to the system capable of storing the communication and making the communication available for reporting, and wherein the communication is included in at least one of a body of the email and an attachment to the email.

19. The system of claim 16 wherein the communication comprises at least one of an SMS communication, an MMS communication, and a voice call communication.

20. The system of claim 16 wherein the computer server includes at least one of an SMS gateway, an email server, an email gateway, a communication server, and a Private Branch Exchange system.

* * * * *